(12) United States Patent
Marking (10) Patent No.: US 12,005,755 B2
(45) Date of Patent: Jun. 11, 2024

(54) METHODS AND APPARATUS FOR CONTROLLING A FLUID DAMPER

(71) Applicant: Fox Factory, Inc., Duluth, GA (US)

(72) Inventor: John Marking, El Cajon, CA (US)

(73) Assignee: Fox Factory, Inc., Duluth, GA (US)

(*) Notice: Subject to any disclaimer, the term of this patent is extended or adjusted under 35 U.S.C. 154(b) by 0 days.

(21) Appl. No.: 17/697,288

(22) Filed: Mar. 17, 2022

(65) Prior Publication Data

US 2022/0281282 A1   Sep. 8, 2022

Related U.S. Application Data

(63) Continuation of application No. 16/565,106, filed on Sep. 9, 2019, now Pat. No. 11,279,198, which is a
(Continued)

(51) Int. Cl.
| | |
|---|---|
| *F16F 9/53* | (2006.01) |
| *B60G 15/12* | (2006.01) |
| *B60G 17/08* | (2006.01) |
| *F16F 9/06* | (2006.01) |
| *B60G 15/06* | (2006.01) |

(52) U.S. Cl.
CPC ............. *B60G 17/08* (2013.01); *B60G 15/12* (2013.01); *F16F 9/061* (2013.01); *F16F 9/066* (2013.01); *F16F 9/53* (2013.01); *F16F 9/535* (2013.01); *B60G 15/062* (2013.01); *B60G 2202/24* (2013.01); *B60G 2206/41* (2013.01); *B60G 2500/10* (2013.01); *B60G 2600/22* (2013.01); *B60G 2800/162* (2013.01); *F16F 2222/06* (2013.01); *F16F 2224/045* (2013.01); *F16F 2228/066* (2013.01)

(58) Field of Classification Search
CPC ........ F16F 9/34; F16F 9/48; F16F 9/49; F16F 9/346; F16F 9/348; F16F 9/512; F16F 9/19; F16F 9/3235; F16F 9/53; B60G 17/056; B60G 2202/24; B60G 2204/45
USPC .................... 188/267, 267.1, 322.15, 322.22
See application file for complete search history.

(56) References Cited

U.S. PATENT DOCUMENTS

| | | |
|---|---|---|
| 435,995 A | 9/1890 | Dunlop |
| 1,078,060 A | 11/1913 | Newman |
| (Continued) | | |

FOREIGN PATENT DOCUMENTS

| | | |
|---|---|---|
| CN | 101468587 A | 7/2009 |
| DE | 1555311 A1 | 8/1970 |
| (Continued) | | |

OTHER PUBLICATIONS

European Search Report for European Application No. 19193903.2, 6 pages, dated Oct. 19, 2021 (dated Oct. 19, 2021).
(Continued)

*Primary Examiner* — Christopher P Schwartz (57) ABSTRACT

A spring for a suspension is described. The spring includes: a spring chamber divided into at least a primary portion and a secondary portion, and a fluid flow path coupled with and between the primary portion and the secondary portion. The fluid flow path includes a bypass mechanism, wherein bypass mechanism is configured for automatically providing resistance within the fluid flow path in response to a compressed condition of the suspension.

10 Claims, 3 Drawing Sheets

Related U.S. Application Data continuation of application No. 15/394,622, filed on Dec. 29, 2016, now Pat. No. 10,406,883, which is a continuation of application No. 14/590,836, filed on Jan. 6, 2015, now Pat. No. 9,550,405, which is a continuation of application No. 12/902,239, filed on Oct. 12, 2010, now Pat. No. 8,955,653.

(60) Provisional application No. 61/250,927, filed on Oct. 13, 2009.

(56) References Cited

U.S. PATENT DOCUMENTS

| | | |
|---|---|---|
| 1,307,502 A | 6/1919 | Martin |
| 1,313,763 A | 8/1919 | Thomas |
| 1,409,849 A | 3/1922 | Haeberlein |
| 1,468,652 A | 9/1923 | Storey et al. |
| 1,492,731 A | 5/1924 | Kerr |
| 1,560,477 A | 11/1925 | Kessler |
| 1,571,788 A | 2/1926 | Bramlette, Jr. |
| 1,575,973 A | 3/1926 | Coleman |
| 1,655,786 A | 1/1928 | Guerritore et al. |
| 1,923,011 A | 8/1933 | Moulton |
| 1,948,600 A | 2/1934 | Templeton |
| 1,970,239 A | 8/1934 | Klaas |
| 2,018,312 A | 10/1935 | Moulton |
| 2,098,119 A | 11/1937 | White |
| 2,115,072 A | 4/1938 | Hunt et al. |
| 2,122,407 A | 7/1938 | Chisholm |
| 2,186,266 A | 1/1940 | Henry |
| 2,259,437 A | 10/1941 | Dean |
| 2,354,340 A | 7/1944 | Utter |
| 2,363,867 A | 11/1944 | Isely |
| 2,379,750 A | 7/1945 | Rossman |
| 2,492,331 A | 12/1949 | Spring |
| 2,518,553 A | 8/1950 | Kieber |
| 2,540,525 A | 2/1951 | Howarth et al. |
| 2,559,633 A | 7/1951 | Maurice et al. |
| 2,588,520 A | 3/1952 | Halgren et al. |
| 2,697,600 A | 12/1954 | Gregoire |
| 2,705,119 A | 3/1955 | Ingwer |
| 2,725,076 A | 11/1955 | Hansen et al. |
| 2,729,308 A | 1/1956 | Koski et al. |
| 2,778,378 A | 1/1957 | Presnell |
| 2,784,962 A | 3/1957 | Sherburne |
| 2,809,722 A | 10/1957 | Smith |
| 2,838,140 A | 6/1958 | Rasmusson et al. |
| 2,846,028 A | 8/1958 | Gunther |
| 2,853,974 A | 9/1958 | Hewitt |
| 2,879,971 A | 3/1959 | Demay |
| 2,883,181 A | 4/1959 | Hogan et al. |
| 2,897,613 A | 8/1959 | Davidson et al. |
| 2,924,304 A | 2/1960 | Patriquin |
| 2,941,629 A | 6/1960 | Etienne et al. |
| 2,967,065 A | 1/1961 | Schwendner |
| 2,973,744 A | 3/1961 | Hennells |
| 2,991,804 A | 7/1961 | Merkle |
| 3,003,595 A | 10/1961 | Patriquin et al. |
| 3,056,598 A | 10/1962 | Sutton et al. |
| 3,071,394 A | 1/1963 | John |
| 3,073,586 A | 1/1963 | Hartel et al. |
| 3,074,709 A | 1/1963 | Ellis et al. |
| 3,085,530 A | 4/1963 | Williamson |
| 3,087,583 A | 4/1963 | Bruns |
| 3,107,753 A | 10/1963 | Georgette et al. |
| 3,127,958 A | 4/1964 | Szostak |
| 3,175,645 A | 3/1965 | Schafer et al. |
| 3,202,413 A | 8/1965 | Colmerauer |
| 3,206,153 A | 9/1965 | Burke |
| 3,207,270 A | 9/1965 | Ellis |
| 3,216,535 A | 11/1965 | Schultze |
| 3,238,850 A | 3/1966 | Desmarchelier |
| 3,284,076 A | 11/1966 | Gibson |
| 3,286,797 A | 11/1966 | Leibfritz et al. |
| 3,405,625 A | 10/1968 | Carlson et al. |
| 3,419,849 A | 12/1968 | Anderson et al. |
| 3,420,493 A | 1/1969 | Kraft et al. |
| 3,447,644 A | 6/1969 | Duckett |
| 3,494,606 A | 2/1970 | Hanchen |
| 3,528,700 A | 9/1970 | Janu et al. |
| 3,537,722 A | 11/1970 | Moulton |
| 3,556,137 A | 1/1971 | Billeter et al. |
| 3,559,027 A | 1/1971 | Arsem |
| 3,560,033 A | 2/1971 | Barkus |
| 3,575,442 A | 4/1971 | Elliott et al. |
| 3,584,331 A | 6/1971 | Richard et al. |
| 3,603,575 A | 9/1971 | Arlasky et al. |
| 3,605,960 A | 9/1971 | Singer |
| 3,618,972 A | 11/1971 | Buhl |
| 3,621,950 A | 11/1971 | Lutz |
| 3,650,033 A | 3/1972 | Behne et al. |
| 3,701,544 A | 10/1972 | Stankovich |
| 3,714,953 A | 2/1973 | Solvang |
| 3,750,856 A | 8/1973 | Kenworthy et al. |
| 3,784,228 A | 1/1974 | Hoffmann et al. |
| 3,791,408 A | 2/1974 | Saitou et al. |
| 3,792,644 A | 2/1974 | Ferguson et al. |
| 3,795,291 A | 3/1974 | Naito et al. |
| 3,830,482 A | 8/1974 | Norris |
| 3,842,753 A | 10/1974 | Ross et al. |
| 3,861,487 A | 1/1975 | Gill |
| 3,903,613 A | 9/1975 | Bisberg |
| 3,941,402 A | 3/1976 | Yankowski et al. |
| 3,974,910 A | 8/1976 | Papai |
| 3,981,204 A | 9/1976 | Starbard et al. |
| 3,981,479 A | 9/1976 | Foster et al. |
| 3,986,118 A | 10/1976 | Madigan |
| 3,995,883 A | 12/1976 | Glaze |
| 4,007,855 A | 2/1977 | Hierath et al. |
| 4,022,113 A | 5/1977 | Blatt et al. |
| 4,032,829 A | 6/1977 | Schenavar et al. |
| 4,036,335 A | 7/1977 | Thompson et al. |
| 4,045,008 A | 8/1977 | Bauer |
| 4,072,087 A | 2/1978 | Mueller et al. |
| 4,103,881 A | 8/1978 | Simich |
| 4,106,522 A | 8/1978 | Manesse |
| 4,114,735 A | 9/1978 | Kato |
| 4,121,610 A | 10/1978 | Harms et al. |
| 4,131,657 A | 12/1978 | Ball et al. |
| 4,139,186 A | 2/1979 | Postema et al. |
| 4,153,237 A | 5/1979 | Supalla |
| 4,159,106 A | 6/1979 | Nyman et al. |
| 4,166,612 A | 9/1979 | Freitag et al. |
| 4,174,098 A | 11/1979 | Baker et al. |
| 4,183,509 A | 1/1980 | Nishikawa et al. |
| 4,236,613 A | 12/1980 | van der Lely |
| 4,287,812 A | 9/1981 | Iizumi |
| 4,291,850 A | 9/1981 | Sharples |
| 4,305,566 A | 12/1981 | Grawunde |
| 4,311,302 A | 1/1982 | Heyer et al. |
| 4,333,668 A | 6/1982 | Hendrickson et al. |
| 4,334,711 A | 6/1982 | Mazur et al. |
| 4,337,850 A | 7/1982 | Shimokura et al. |
| 4,348,016 A | 9/1982 | Milly |
| 4,351,515 A | 9/1982 | Yoshida |
| 4,366,969 A | 1/1983 | Benya et al. |
| 4,387,781 A | 6/1983 | Ezell et al. |
| 4,437,548 A | 3/1984 | Ashiba et al. |
| 4,465,299 A | 8/1984 | Stone et al. |
| 4,474,363 A | 10/1984 | Numazawa et al. |
| 4,491,207 A | 1/1985 | Boonchanta et al. |
| 4,500,827 A | 2/1985 | Merritt et al. |
| 4,502,673 A | 3/1985 | Clark et al. |
| 4,529,180 A | 7/1985 | Hill |
| 4,546,959 A | 10/1985 | Tanno |
| 4,548,233 A | 10/1985 | Wolfges |
| 4,550,899 A | 11/1985 | Holley |
| 4,570,851 A | 2/1986 | Cirillo et al. |
| 4,572,317 A | 2/1986 | Isono et al. |
| 4,616,810 A | 10/1986 | Richardson et al. |
| 4,620,619 A | 11/1986 | Emura et al. |
| 4,624,346 A | 11/1986 | Katz et al. |
| 4,630,818 A | 12/1986 | Saarinen |
| 4,634,142 A | 1/1987 | Woods et al. |

(56) References Cited

U.S. PATENT DOCUMENTS

| | | |
|---|---|---|
| 4,647,068 A | 3/1987 | Asami et al. |
| 4,655,440 A | 4/1987 | Eckert |
| 4,657,280 A | 4/1987 | Ohmori et al. |
| 4,659,104 A | 4/1987 | Tanaka et al. |
| 4,660,689 A | 4/1987 | Hayashi et al. |
| 4,662,616 A | 5/1987 | Hennells |
| 4,673,194 A | 6/1987 | Sugasawa |
| 4,696,489 A | 9/1987 | Fujishiro et al. |
| 4,709,779 A | 12/1987 | Takehara |
| 4,723,753 A | 2/1988 | Torimoto et al. |
| 4,729,459 A | 3/1988 | Inagaki et al. |
| 4,732,244 A | 3/1988 | Verkuylen |
| 4,743,000 A | 5/1988 | Karnopp |
| 4,744,444 A | 5/1988 | Gillingham |
| 4,750,735 A | 6/1988 | Furgerson et al. |
| 4,765,648 A | 8/1988 | Mander et al. |
| 4,773,671 A | 9/1988 | Inagaki |
| 4,786,034 A | 11/1988 | Heess et al. |
| 4,802,561 A | 2/1989 | Knecht et al. |
| 4,806,082 A | 2/1989 | Schenk |
| 4,815,575 A | 3/1989 | Murty et al. |
| 4,821,852 A | 4/1989 | Yokoya |
| 4,826,207 A | 5/1989 | Yoshioka et al. |
| 4,830,395 A | 5/1989 | Foley |
| 4,836,578 A | 6/1989 | Soltis |
| 4,838,306 A | 6/1989 | Horn et al. |
| 4,838,394 A | 6/1989 | Lemme et al. |
| 4,838,527 A | 6/1989 | Holley |
| 4,846,317 A | 7/1989 | Hudgens |
| 4,858,733 A | 8/1989 | Noguchi et al. |
| 4,892,328 A | 1/1990 | Kurtzman et al. |
| 4,919,166 A | 4/1990 | Sims et al. |
| 4,936,423 A | 6/1990 | Karnopp |
| 4,936,424 A | 6/1990 | Costa |
| 4,938,228 A | 7/1990 | Righter |
| 4,949,262 A | 8/1990 | Buma et al. |
| 4,949,989 A | 8/1990 | Kakizaki et al. |
| 4,958,706 A | 9/1990 | Richardson et al. |
| 4,972,928 A | 11/1990 | Sirven |
| 4,975,849 A | 12/1990 | Ema et al. |
| 4,984,819 A | 1/1991 | Kakizaki et al. |
| 4,986,393 A | 1/1991 | Preukschat et al. |
| 5,027,303 A | 6/1991 | Witte |
| 5,031,455 A | 7/1991 | Cline |
| 5,036,934 A | 8/1991 | Nishina et al. |
| 5,040,381 A | 8/1991 | Hazen |
| 5,044,614 A | 9/1991 | Rau |
| 5,060,910 A | 10/1991 | Iwata et al. |
| 5,060,959 A | 10/1991 | Davis et al. |
| 5,072,812 A | 12/1991 | Imaizumi |
| 5,074,624 A | 12/1991 | Stauble et al. |
| 5,076,404 A | 12/1991 | Gustafsson |
| 5,080,392 A | 1/1992 | Bazergui |
| 5,094,325 A | 3/1992 | Smith |
| 5,105,918 A | 4/1992 | Hagiwara et al. |
| 5,113,980 A | 5/1992 | Furrer et al. |
| 5,127,634 A | 7/1992 | Le Gourvellec |
| 5,152,547 A | 10/1992 | Davis |
| 5,161,653 A | 11/1992 | Hare |
| 5,161,817 A | 11/1992 | Daum et al. |
| 5,163,742 A | 11/1992 | Topfer et al. |
| 5,178,242 A | 1/1993 | Nakamura et al. |
| 5,186,481 A | 2/1993 | Turner |
| 5,203,584 A | 4/1993 | Butsuen et al. |
| 5,207,300 A | 5/1993 | Engel et al. |
| 5,207,774 A | 5/1993 | Wolfe et al. |
| 5,230,364 A | 7/1993 | Leng et al. |
| 5,231,583 A | 7/1993 | Lizell |
| 5,236,169 A | 8/1993 | Johnsen et al. |
| 5,246,247 A | 9/1993 | Runkel |
| 5,248,014 A | 9/1993 | Ashiba |
| 5,259,487 A | 11/1993 | Petek et al. |
| 5,263,559 A | 11/1993 | Mettner |
| 5,265,902 A | 11/1993 | Lewis |
| 5,266,065 A | 11/1993 | Ancarani |
| 5,275,086 A | 1/1994 | Stallings, Jr. |
| 5,277,283 A | 1/1994 | Yamaoka et al. |
| 5,283,733 A | 2/1994 | Colley |
| 5,284,330 A | 2/1994 | Carlson et al. |
| 5,293,971 A | 3/1994 | Kanari |
| 5,295,074 A | 3/1994 | Williams |
| 5,295,563 A | 3/1994 | Bennett |
| 5,295,916 A | 3/1994 | Chattin |
| 5,297,045 A | 3/1994 | Williams et al. |
| 5,301,776 A | 4/1994 | Beck |
| 5,307,907 A | 5/1994 | Nakamura et al. |
| 5,310,203 A | 5/1994 | Chen |
| 5,311,709 A | 5/1994 | Kobori et al. |
| 5,318,066 A | 6/1994 | Burgorf et al. |
| 5,328,004 A | 7/1994 | Fannin et al. |
| 5,346,242 A | 9/1994 | Karnopp |
| 5,347,186 A | 9/1994 | Konotchick et al. |
| 5,348,112 A | 9/1994 | Vaillancourt |
| 5,372,223 A | 12/1994 | DeKock et al. |
| 5,372,224 A | 12/1994 | Samonil et al. |
| 5,381,952 A | 1/1995 | Duprez |
| 5,390,121 A | 2/1995 | Wolfe |
| 5,390,949 A | 2/1995 | Naganathan et al. |
| 5,392,885 A | 2/1995 | Patzenhauer et al. |
| 5,392,886 A | 2/1995 | Drummond |
| 5,396,973 A | 3/1995 | Schwemmer et al. |
| 5,398,787 A | 3/1995 | Woessner et al. |
| 5,413,196 A | 5/1995 | Forster |
| 5,445,366 A | 8/1995 | Shih et al. |
| 5,467,280 A | 11/1995 | Kimura |
| 5,475,593 A | 12/1995 | Townend |
| 5,480,011 A | 1/1996 | Nagai et al. |
| 5,485,417 A | 1/1996 | Wolf et al. |
| 5,487,006 A | 1/1996 | Kakizaki et al. |
| 5,503,258 A | 4/1996 | Clarke et al. |
| 5,517,898 A | 5/1996 | Kim et al. |
| 5,542,150 A | 8/1996 | Tu |
| 5,551,674 A | 9/1996 | Johnsen |
| 5,553,836 A | 9/1996 | Ericson |
| 5,558,190 A | 9/1996 | Chang |
| 5,566,794 A | 10/1996 | Wiard |
| 5,578,877 A | 11/1996 | Tiemann |
| 5,586,637 A | 12/1996 | Aidlin et al. |
| 5,588,510 A | 12/1996 | Wilke |
| 5,592,401 A | 1/1997 | Kramer |
| 5,597,180 A | 1/1997 | Ganzel et al. |
| 5,598,337 A | 1/1997 | Butsuen et al. |
| 5,599,244 A | 2/1997 | Ethington |
| 5,601,164 A | 2/1997 | Ohsaki et al. |
| 5,611,413 A | 3/1997 | Feigel |
| 5,634,563 A | 6/1997 | Peng |
| 5,651,433 A | 7/1997 | Wirth et al. |
| 5,657,840 A | 8/1997 | Lizell |
| 5,687,575 A | 11/1997 | Keville et al. |
| 5,697,477 A | 12/1997 | Hiramoto et al. |
| 5,699,885 A | 12/1997 | Forster |
| 5,722,645 A | 3/1998 | Reitter |
| 5,735,372 A | 4/1998 | Hamilton et al. |
| 5,803,443 A | 9/1998 | Chang |
| 5,806,159 A | 9/1998 | Ohnishi et al. |
| 5,810,128 A | 9/1998 | Eriksson et al. |
| 5,810,384 A | 9/1998 | Iwasaki et al. |
| 5,813,456 A | 9/1998 | Milner et al. |
| 5,813,731 A | 9/1998 | Newman et al. |
| 5,816,281 A | 10/1998 | Mixon |
| 5,818,132 A | 10/1998 | Konotchick et al. |
| 5,826,935 A | 10/1998 | DeFreitas et al. |
| 5,828,843 A | 10/1998 | Samuel et al. |
| 5,829,733 A | 11/1998 | Becker |
| 5,833,036 A | 11/1998 | Gillespie |
| 5,850,352 A | 12/1998 | Moezzi et al. |
| 5,850,896 A | 12/1998 | Tanaka |
| 5,853,071 A | 12/1998 | Robinson |
| 5,872,418 A | 2/1999 | Wischnewskiy |
| 5,884,921 A | 3/1999 | Katsuda et al. |
| 5,937,975 A | 8/1999 | Forster |
| 5,947,238 A | 9/1999 | Jolly et al. |
| 5,952,823 A | 9/1999 | Sprecher et al. |
| 5,954,318 A | 9/1999 | Kluhsman |

(56) References Cited

U.S. PATENT DOCUMENTS

| | | | |
|---|---|---|---|
| 5,956,951 A * | 9/1999 | O'Callaghan | B60G 17/08 60/326 |
| 5,957,252 A | 9/1999 | Berthold | |
| 5,971,116 A | 10/1999 | Franklin | |
| 5,987,368 A | 11/1999 | Kamimae et al. | |
| 5,988,330 A | 11/1999 | Morris | |
| 5,988,332 A | 11/1999 | Marzocchi et al. | |
| 5,988,655 A | 11/1999 | Sakai et al. | |
| 5,992,450 A | 11/1999 | Parker et al. | |
| 5,996,745 A | 12/1999 | Jones et al. | |
| 5,996,746 A | 12/1999 | Turner et al. | |
| 5,999,868 A | 12/1999 | Beno et al. | |
| 6,000,702 A | 12/1999 | Streiter | |
| 6,013,007 A | 1/2000 | Root et al. | |
| 6,017,047 A | 1/2000 | Hoose | |
| 6,029,958 A | 2/2000 | Larsson et al. | |
| 6,035,979 A | 3/2000 | Forster | |
| 6,050,583 A | 4/2000 | Bohn | |
| 6,058,340 A | 5/2000 | Uchiyama et al. | |
| 6,067,490 A | 5/2000 | Ichimaru et al. | |
| 6,073,536 A | 6/2000 | Campbell | |
| 6,073,700 A | 6/2000 | Tsuji et al. | |
| 6,073,736 A | 6/2000 | Franklin | |
| 6,079,526 A | 6/2000 | Nezu et al. | |
| 6,092,011 A | 7/2000 | Hiramoto et al. | |
| 6,092,816 A | 7/2000 | Sekine et al. | |
| 6,105,988 A | 8/2000 | Turner et al. | |
| 6,112,868 A | 9/2000 | Graham et al. | |
| 6,120,049 A | 9/2000 | Gonzalez et al. | |
| 6,131,709 A * | 10/2000 | Jolly | F16F 9/20 60/326 |
| 6,135,434 A | 10/2000 | Marking | |
| 6,141,969 A | 11/2000 | Launchbury et al. | |
| 6,151,930 A | 11/2000 | Carlson | |
| 6,152,856 A | 11/2000 | Studor et al. | |
| 6,157,103 A | 12/2000 | Ohta et al. | |
| 6,179,098 B1 | 1/2001 | Hayakawa et al. | |
| 6,182,687 B1 | 2/2001 | Förster et al. | |
| 6,196,555 B1 | 3/2001 | Gaibler | |
| 6,199,669 B1 | 3/2001 | Huang et al. | |
| 6,203,026 B1 | 3/2001 | Jones | |
| 6,213,263 B1 | 4/2001 | De Frenne | |
| 6,215,217 B1 | 4/2001 | Kurosawa et al. | |
| 6,217,049 B1 | 4/2001 | Becker | |
| 6,219,045 B1 | 4/2001 | Leahy et al. | |
| 6,244,398 B1 | 6/2001 | Girvin et al. | |
| 6,254,067 B1 | 7/2001 | Yih | |
| 6,279,702 B1 | 8/2001 | Koh | |
| 6,283,462 B1 | 9/2001 | Emmert | |
| 6,290,034 B1 | 9/2001 | Ichimaru | |
| 6,293,530 B1 | 9/2001 | Delorenzis et al. | |
| 6,296,091 B1 | 10/2001 | Hamilton | |
| 6,296,092 B1 | 10/2001 | Marking et al. | |
| 6,311,962 B1 | 11/2001 | Marking | |
| 6,318,525 B1 | 11/2001 | Vignocchi et al. | |
| 6,321,888 B1 | 11/2001 | Reybrouck et al. | |
| 6,322,468 B1 | 11/2001 | Wing et al. | |
| 6,336,648 B1 | 1/2002 | Bohn | |
| 6,343,807 B1 | 2/2002 | Rathbun | |
| 6,359,837 B1 | 3/2002 | Tsukamoto et al. | |
| 6,360,857 B1 | 3/2002 | Fox et al. | |
| 6,371,262 B1 | 4/2002 | Katou et al. | |
| 6,371,267 B1 | 4/2002 | Kao et al. | |
| 6,378,816 B1 | 4/2002 | Pfister | |
| 6,378,885 B1 | 4/2002 | Ellsworth et al. | |
| 6,382,370 B1 | 5/2002 | Girvin | |
| 6,389,341 B1 | 5/2002 | Davis | |
| 6,390,747 B1 | 5/2002 | Commins | |
| 6,394,238 B1 | 5/2002 | Rogala | |
| 6,401,883 B1 | 6/2002 | Nyce et al. | |
| 6,412,788 B1 | 7/2002 | Ichimaru | |
| 6,415,895 B2 | 7/2002 | Marking et al. | |
| 6,418,360 B1 | 7/2002 | Spivey et al. | |
| 6,427,812 B2 | 8/2002 | Crawley et al. | |
| 6,431,573 B1 | 8/2002 | Lerman et al. | |
| 6,434,460 B1 | 8/2002 | Uchino et al. | |
| 6,446,771 B1 | 9/2002 | Sintorn et al. | |
| 6,458,060 B1 | 10/2002 | Watterson et al. | |
| 6,460,567 B1 | 10/2002 | Hansen et al. | |
| 6,467,593 B1 | 10/2002 | Corradini et al. | |
| 6,474,454 B2 | 11/2002 | Matsumoto et al. | |
| 6,474,753 B1 | 11/2002 | Rieth et al. | |
| 6,501,554 B1 | 12/2002 | Hackney et al. | |
| 6,502,837 B1 | 1/2003 | Hamilton et al. | |
| 6,510,929 B1 * | 1/2003 | Gordaninejad | F16F 9/535 188/320 |
| 6,520,297 B1 | 2/2003 | Lumpkin et al. | |
| 6,527,093 B2 | 3/2003 | Oliver et al. | |
| 6,592,136 B2 | 7/2003 | Becker et al. | |
| 6,604,751 B2 | 8/2003 | Fox | |
| 6,609,686 B2 | 8/2003 | Malizia | |
| 6,619,615 B1 | 9/2003 | Mayr et al. | |
| 6,623,389 B1 | 9/2003 | Campagnolo | |
| 6,648,109 B2 | 11/2003 | Farr et al. | |
| 6,651,788 B1 | 11/2003 | Wohlfarth | |
| 6,659,240 B2 | 12/2003 | Dernebo | |
| 6,659,241 B2 | 12/2003 | Sendrea | |
| 6,672,687 B2 | 1/2004 | Nishio | |
| 6,676,119 B2 | 1/2004 | Becker et al. | |
| 6,691,991 B1 | 2/2004 | Huang | |
| 6,701,234 B1 | 3/2004 | Vogelsang et al. | |
| 6,722,678 B2 | 4/2004 | McAndrews | |
| 6,732,033 B2 | 5/2004 | LaPlante et al. | |
| 6,755,113 B2 | 6/2004 | Shih | |
| 6,782,980 B2 | 8/2004 | Nakadate | |
| 6,817,454 B2 | 11/2004 | Nezu et al. | |
| 6,827,184 B1 | 12/2004 | Lin | |
| 6,837,827 B1 | 1/2005 | Lee et al. | |
| 6,840,257 B2 | 1/2005 | Dario et al. | |
| 6,853,955 B1 | 2/2005 | Burrell et al. | |
| 6,857,625 B2 | 2/2005 | Löser et al. | |
| 6,863,291 B2 | 3/2005 | Miyoshi | |
| 6,883,650 B2 | 4/2005 | van Wonderen et al. | |
| 6,902,513 B1 | 6/2005 | McClure et al. | |
| 6,905,203 B2 | 6/2005 | Kremers et al. | |
| 6,920,951 B2 | 7/2005 | Song et al. | |
| 6,921,351 B1 | 7/2005 | Hickman et al. | |
| 6,923,853 B2 | 8/2005 | Kremers et al. | |
| 6,931,958 B2 | 8/2005 | Takeda | |
| 6,935,157 B2 | 8/2005 | Miller | |
| 6,952,060 B2 | 10/2005 | Goldner et al. | |
| 6,959,906 B2 | 11/2005 | Hoenig et al. | |
| 6,959,921 B2 | 11/2005 | Rose | |
| 6,966,412 B2 | 11/2005 | Braswell et al. | |
| 6,978,871 B2 | 12/2005 | Holiviers | |
| 6,978,872 B2 | 12/2005 | Turner | |
| 6,991,076 B2 | 1/2006 | McAndrews | |
| 7,025,367 B2 | 4/2006 | McKinnon et al. | |
| 7,076,351 B2 | 7/2006 | Hamilton et al. | |
| 7,128,192 B2 | 10/2006 | Fox | |
| 7,128,693 B2 | 10/2006 | Brown et al. | |
| 7,135,794 B2 | 11/2006 | Kühnel | |
| 7,147,207 B2 | 12/2006 | Jordan et al. | |
| 7,163,222 B2 | 1/2007 | Becker et al. | |
| 7,166,062 B1 | 1/2007 | Watterson et al. | |
| 7,166,064 B2 | 1/2007 | Ashby et al. | |
| 7,204,466 B2 | 4/2007 | Hsieh | |
| 7,207,912 B2 | 4/2007 | Takeda et al. | |
| 7,208,845 B2 | 4/2007 | Schaefer et al. | |
| 7,217,224 B2 | 5/2007 | Thomas | |
| 7,234,574 B2 | 6/2007 | Matsunaga et al. | |
| 7,234,575 B2 | 6/2007 | Anderfaas et al. | |
| 7,234,680 B2 | 6/2007 | Hull et al. | |
| 7,243,763 B2 | 7/2007 | Carlson | |
| 7,255,210 B2 | 8/2007 | Larsson et al. | |
| 7,270,221 B2 | 9/2007 | McAndrews | |
| 7,270,222 B2 | 9/2007 | Aymar et al. | |
| 7,287,760 B1 | 10/2007 | Quick et al. | |
| 7,288,038 B2 | 10/2007 | Takeda et al. | |
| 7,289,138 B2 | 10/2007 | Foote et al. | |
| 7,292,867 B2 | 11/2007 | Werner et al. | |
| 7,293,764 B2 | 11/2007 | Fang | |
| 7,299,112 B2 | 11/2007 | LaPlante et al. | |
| 7,302,961 B2 | 12/2007 | Martin et al. | |

(56) References Cited

U.S. PATENT DOCUMENTS

| | | |
|---|---|---|
| 7,306,206 B2 | 12/2007 | Turner |
| 7,316,406 B2 | 1/2008 | Kimura et al. |
| 7,320,387 B2 | 1/2008 | Sendrea |
| 7,325,660 B2 | 2/2008 | Norgaard et al. |
| 7,363,129 B1 | 4/2008 | Barnicle et al. |
| 7,373,232 B2 | 5/2008 | Guderzo |
| 7,374,028 B2 | 5/2008 | Fox |
| 7,397,355 B2 | 7/2008 | Tracy |
| 7,413,062 B2 | 8/2008 | Vandewal |
| 7,413,063 B1 | 8/2008 | Davis |
| 7,415,336 B1 | 8/2008 | Burch et al. |
| 7,422,092 B2 | 9/2008 | Hitchcock et al. |
| 7,441,638 B2 | 10/2008 | Hanawa |
| 7,469,910 B2 | 12/2008 | Münster et al. |
| 7,484,603 B2 | 2/2009 | Fox |
| 7,490,705 B2 | 2/2009 | Fox |
| 7,513,490 B2 | 4/2009 | Robertson |
| 7,523,617 B2 | 4/2009 | Colpitts et al. |
| 7,558,313 B2 | 7/2009 | Feher |
| 7,558,574 B2 | 7/2009 | Feher et al. |
| 7,566,290 B2 | 7/2009 | Lee et al. |
| 7,569,952 B1 | 8/2009 | Bono et al. |
| 7,581,743 B2 | 9/2009 | Graney et al. |
| 7,591,352 B2 | 9/2009 | Hanawa |
| 7,600,616 B2 | 10/2009 | Anderfaas et al. |
| 7,628,259 B2 | 12/2009 | Norgaard et al. |
| 7,628,414 B2 | 12/2009 | Dobson et al. |
| 7,631,882 B2 | 12/2009 | Hirao et al. |
| 7,654,369 B2 | 2/2010 | Murray et al. |
| 7,673,936 B2 | 3/2010 | Hsu et al. |
| 7,684,911 B2 | 3/2010 | Seifert et al. |
| 7,694,785 B2 | 4/2010 | Nakadate |
| 7,694,987 B2 | 4/2010 | McAndrews |
| 7,699,753 B2 | 4/2010 | Daikeler et al. |
| 7,703,585 B2 | 4/2010 | Fox |
| 7,722,056 B2 | 5/2010 | Inoue et al. |
| 7,722,069 B2 | 5/2010 | Shirai |
| 7,726,042 B2 | 6/2010 | Meschan |
| 7,730,906 B2 | 6/2010 | Kleinert et al. |
| 7,736,272 B2 | 6/2010 | Martens |
| 7,744,097 B2 | 6/2010 | Noguchi |
| 7,764,990 B2 | 7/2010 | Martikka et al. |
| 7,766,794 B2 | 8/2010 | Oliver et al. |
| 7,770,701 B1 | 8/2010 | Davis |
| 7,775,128 B2 | 8/2010 | Roessingh et al. |
| 7,779,974 B2 | 8/2010 | Timoney et al. |
| 7,795,711 B2 | 9/2010 | Sauciuc et al. |
| 7,828,125 B2 | 11/2010 | Sekiya et al. |
| 7,828,126 B2 | 11/2010 | Lun |
| 7,837,213 B2 | 11/2010 | Colegrove et al. |
| 7,840,346 B2 | 11/2010 | Huhtala et al. |
| 7,841,258 B2 | 11/2010 | Komatsu et al. |
| 7,845,602 B1 | 12/2010 | Young et al. |
| 7,857,325 B2 | 12/2010 | Copsey et al. |
| 7,872,764 B2 | 1/2011 | Higgins-Luthman et al. |
| 7,874,567 B2 | 1/2011 | Ichida et al. |
| 7,901,292 B1 | 3/2011 | Uhlir et al. |
| 7,909,348 B2 | 3/2011 | Klieber et al. |
| 7,927,253 B2 | 4/2011 | Dibenedetto et al. |
| 7,931,132 B2 | 4/2011 | Braun |
| 7,931,563 B2 | 4/2011 | Shaw et al. |
| 7,946,163 B2 | 5/2011 | Gartner |
| 7,975,814 B2 | 7/2011 | Soederdahl |
| 8,016,349 B2 | 9/2011 | Mouri et al. |
| 8,021,270 B2 | 9/2011 | D'Eredita |
| 8,042,427 B2 | 10/2011 | Kawakami et al. |
| 8,056,392 B2 | 11/2011 | Ryan et al. |
| 8,069,964 B2 | 12/2011 | Deferme et al. |
| 8,087,676 B2 | 1/2012 | McIntyre |
| 8,091,910 B2 | 1/2012 | Hara et al. |
| 8,104,591 B2 | 1/2012 | Barefoot et al. |
| 8,121,757 B2 | 2/2012 | Extance et al. |
| 8,121,785 B2 | 2/2012 | Swisher et al. |
| 8,127,900 B2 | 3/2012 | Inoue |
| 8,136,877 B2 | 3/2012 | Walsh |
| 8,141,438 B2 | 3/2012 | Roessingh et al. |
| 8,151,952 B2 | 4/2012 | Lenz et al. |
| 8,191,964 B2 | 6/2012 | Hsu et al. |
| 8,201,476 B2 | 6/2012 | Tsumiyama |
| 8,205,864 B2 | 6/2012 | Michel |
| 8,210,106 B2 | 7/2012 | Tai et al. |
| 8,210,330 B2 | 7/2012 | Vandewal |
| 8,246,065 B1 | 8/2012 | Kodama et al. |
| 8,256,587 B2 | 9/2012 | Bakke et al. |
| 8,256,732 B1 | 9/2012 | Young et al. |
| 8,262,058 B2 | 9/2012 | Kot |
| 8,262,062 B2 | 9/2012 | Kamo et al. |
| 8,262,100 B2 | 9/2012 | Thomas |
| 8,265,825 B2 | 9/2012 | Kajino et al. |
| 8,285,447 B2 | 10/2012 | Bennett et al. |
| 8,286,982 B2 | 10/2012 | Plantet et al. |
| 8,291,889 B2 | 10/2012 | Shafer et al. |
| 8,292,274 B2 | 10/2012 | Adoline et al. |
| 8,307,965 B2 | 11/2012 | Foster et al. |
| 8,308,124 B2 | 11/2012 | Hsu |
| 8,317,261 B2 | 11/2012 | Walsh et al. |
| 8,322,497 B2 * | 12/2012 | Marjoram ............... F16F 9/535 188/267.2 |
| 8,328,454 B2 | 12/2012 | McAndrews et al. |
| 8,336,683 B2 | 12/2012 | McAndrews et al. |
| 8,364,389 B2 | 1/2013 | Dorogusker et al. |
| 8,393,446 B2 | 3/2013 | Haugen |
| 8,413,773 B2 | 4/2013 | Anderfaas et al. |
| 8,423,244 B2 | 4/2013 | Proemm et al. |
| 8,430,770 B2 | 4/2013 | Dugan et al. |
| 8,458,080 B2 | 6/2013 | Shirai |
| 8,480,064 B2 | 7/2013 | Talavasek |
| 8,495,947 B2 | 7/2013 | Hata |
| 8,550,223 B2 | 10/2013 | Cox et al. |
| 8,550,551 B2 | 10/2013 | Shirai |
| 8,556,048 B2 | 10/2013 | Maeda et al. |
| 8,556,049 B2 | 10/2013 | Jee |
| 8,596,663 B2 | 12/2013 | Shirai et al. |
| 8,616,351 B2 | 12/2013 | Roessle et al. |
| 8,622,180 B2 | 1/2014 | Wootten et al. |
| 8,627,930 B2 | 1/2014 | Smith et al. |
| 8,627,932 B2 | 1/2014 | Marking |
| 8,641,073 B2 | 2/2014 | Lee et al. |
| 8,651,251 B2 | 2/2014 | Preukschat et al. |
| 8,655,548 B2 | 2/2014 | Ichida et al. |
| 8,684,367 B2 | 4/2014 | Haugen |
| 8,727,947 B2 | 5/2014 | Tagliabue |
| 8,744,699 B2 | 6/2014 | Yamaguchi et al. |
| 8,752,682 B2 | 6/2014 | Park et al. |
| 8,763,770 B2 | 7/2014 | Marking |
| 8,770,357 B2 | 7/2014 | Sims et al. |
| 8,781,680 B2 | 7/2014 | Ichida et al. |
| 8,781,690 B2 | 7/2014 | Hara et al. |
| 8,814,109 B2 | 8/2014 | Calendrille et al. |
| 8,833,786 B2 | 9/2014 | Camp et al. |
| 8,838,335 B2 | 9/2014 | Bass et al. |
| 8,845,496 B2 | 9/2014 | Arrasvuori et al. |
| 8,857,580 B2 | 10/2014 | Marking |
| 8,868,253 B2 | 10/2014 | Hashimoto et al. |
| 8,888,115 B2 | 11/2014 | Chubbuck et al. |
| 8,909,424 B2 | 12/2014 | Jordan et al. |
| 8,935,036 B1 | 1/2015 | Christensen et al. |
| 8,936,139 B2 | 1/2015 | Galasso et al. |
| 8,950,771 B2 | 2/2015 | Felsl et al. |
| 8,955,653 B2 * | 2/2015 | Marking ............... B60G 17/08 188/269 |
| 8,967,343 B2 | 3/2015 | Battlogg et al. |
| 8,985,594 B2 | 3/2015 | Yabumoto |
| 8,991,571 B2 | 3/2015 | Murakami |
| 9,033,122 B2 | 5/2015 | Ericksen et al. |
| 9,038,791 B2 | 5/2015 | Marking |
| 9,047,778 B1 | 6/2015 | Cazanas et al. |
| 9,057,416 B2 | 6/2015 | Talavasek |
| 9,073,592 B2 | 7/2015 | Hsu |
| 9,103,400 B2 | 8/2015 | Becker |
| 9,108,098 B2 | 8/2015 | Galasso et al. |
| 9,120,362 B2 | 9/2015 | Marking |
| 9,126,647 B2 | 9/2015 | Kuo |
| 9,140,325 B2 | 9/2015 | Cox et al. |

(56) References Cited

U.S. PATENT DOCUMENTS

| | | | |
|---|---|---|---|
| 9,157,523 B2 | 10/2015 | Miki et al. | |
| 9,186,949 B2 | 11/2015 | Galasso et al. | |
| 9,194,456 B2 | 11/2015 | Laird et al. | |
| 9,199,690 B2 | 12/2015 | Watarai | |
| 9,217,482 B2 | 12/2015 | Schürmann et al. | |
| 9,229,712 B2 | 1/2016 | Takamoto et al. | |
| 9,239,090 B2 | 1/2016 | Marking et al. | |
| 9,278,598 B2 | 3/2016 | Galasso et al. | |
| 9,303,712 B2 | 4/2016 | Cox | |
| 9,353,818 B2 | 5/2016 | Marking | |
| 9,366,307 B2 | 6/2016 | Marking | |
| 9,415,659 B2 | 8/2016 | Kikuchi et al. | |
| 9,422,018 B2 | 8/2016 | Pelot et al. | |
| 9,422,025 B2 | 8/2016 | Pezzi et al. | |
| 9,452,654 B2 | 9/2016 | Ericksen et al. | |
| 9,523,406 B2 | 12/2016 | Galasso et al. | |
| 9,528,565 B2 | 12/2016 | Marking | |
| 9,550,405 B2* | 1/2017 | Marking | F16F 9/066 |
| 9,556,925 B2 | 1/2017 | Marking | |
| 9,616,728 B2 | 4/2017 | Marking | |
| 9,650,094 B2 | 5/2017 | Laird et al. | |
| 9,663,181 B2 | 5/2017 | Ericksen et al. | |
| 9,682,604 B2 | 6/2017 | Cox et al. | |
| 9,765,842 B2 | 9/2017 | Noguchi | |
| 9,784,333 B2 | 10/2017 | Marking | |
| 9,810,282 B2 | 11/2017 | Roessle et al. | |
| 9,975,598 B2 | 5/2018 | Bender et al. | |
| 10,012,282 B2 | 7/2018 | Kimura et al. | |
| 10,029,172 B2 | 7/2018 | Galasso et al. | |
| 10,036,443 B2 | 7/2018 | Galasso et al. | |
| 10,040,328 B2 | 8/2018 | Marking | |
| 10,040,329 B2 | 8/2018 | Ericksen et al. | |
| 10,054,185 B2 | 8/2018 | Cox | |
| 10,072,724 B2 | 9/2018 | Haugen et al. | |
| 10,086,670 B2 | 10/2018 | Galasso et al. | |
| 10,089,868 B1 | 10/2018 | Hayward | |
| 10,094,443 B2 | 10/2018 | Marking | |
| 10,145,435 B2 | 12/2018 | Galasso et al. | |
| 10,180,171 B2 | 1/2019 | Laird et al. | |
| 10,330,171 B2 | 6/2019 | Cox et al. | |
| 10,336,148 B2 | 7/2019 | Ericksen et al. | |
| 10,336,149 B2 | 7/2019 | Ericksen et al. | |
| 10,400,847 B2 | 9/2019 | Marking | |
| 10,406,883 B2* | 9/2019 | Marking | F16F 9/066 |
| 10,415,662 B2 | 9/2019 | Marking | |
| 10,443,671 B2 | 10/2019 | Marking | |
| 10,473,179 B2 | 11/2019 | Ripa | |
| 10,550,909 B2 | 2/2020 | Haugen | |
| 10,591,015 B2 | 3/2020 | Galasso et al. | |
| 10,604,207 B2 | 3/2020 | Winefordner et al. | |
| 10,677,309 B2 | 6/2020 | Ericksen et al. | |
| 10,697,514 B2 | 6/2020 | Marking | |
| 10,718,397 B2 | 7/2020 | Marking | |
| 10,737,546 B2 | 8/2020 | Tong | |
| 11,162,555 B2 | 11/2021 | Haugen | |
| 11,279,198 B2* | 3/2022 | Marking | F16F 9/066 |
| 11,472,252 B2 | 10/2022 | Tong | |
| 11,708,878 B2 | 7/2023 | Marking | |
| 2001/0017334 A1 | 8/2001 | Vincent | |
| 2001/0022621 A1 | 9/2001 | Squibbs | |
| 2001/0030408 A1 | 10/2001 | Miyoshi et al. | |
| 2001/0042663 A1 | 11/2001 | Marking et al. | |
| 2001/0055373 A1 | 12/2001 | Yamashita | |
| 2002/0000352 A1 | 1/2002 | Matsumoto et al. | |
| 2002/0032508 A1 | 3/2002 | Uchino et al. | |
| 2002/0045987 A1 | 4/2002 | Ohata et al. | |
| 2002/0050112 A1 | 5/2002 | Koch et al. | |
| 2002/0050518 A1 | 5/2002 | Roustaei | |
| 2002/0053493 A1 | 5/2002 | Sintorn et al. | |
| 2002/0055422 A1 | 5/2002 | Airmet et al. | |
| 2002/0063469 A1 | 5/2002 | Nishio | |
| 2002/0089107 A1 | 7/2002 | Koh | |
| 2002/0095979 A1 | 7/2002 | Shirato et al. | |
| 2002/0113347 A1 | 8/2002 | Robbins et al. | |
| 2002/0121416 A1 | 9/2002 | Katayama et al. | |
| 2002/0130000 A1 | 9/2002 | Lisenker et al. | |
| 2002/0130003 A1* | 9/2002 | Lisenker | F16F 9/535 188/267.2 |
| 2002/0180166 A1 | 12/2002 | Voss | |
| 2002/0185581 A1 | 12/2002 | Trask et al. | |
| 2002/0187867 A1 | 12/2002 | Ichida et al. | |
| 2003/0001346 A1 | 1/2003 | Hamilton et al. | |
| 2003/0001358 A1 | 1/2003 | Becker et al. | |
| 2003/0034697 A1 | 2/2003 | Goldner et al. | |
| 2003/0040348 A1 | 2/2003 | Martens et al. | |
| 2003/0051954 A1 | 3/2003 | Sendrea | |
| 2003/0054327 A1 | 3/2003 | Evensen et al. | |
| 2003/0065430 A1 | 4/2003 | Lu et al. | |
| 2003/0075403 A1 | 4/2003 | Dernebo | |
| 2003/0103651 A1 | 6/2003 | Novak | |
| 2003/0128275 A1 | 7/2003 | Maguire | |
| 2003/0160369 A1 | 8/2003 | LaPlante et al. | |
| 2003/0191567 A1 | 10/2003 | Gentilcore | |
| 2003/0216845 A1 | 11/2003 | Williston | |
| 2004/0004659 A1 | 1/2004 | Foote et al. | |
| 2004/0017455 A1 | 1/2004 | Kremers et al. | |
| 2004/0021754 A1 | 2/2004 | Kremers et al. | |
| 2004/0075350 A1 | 4/2004 | Kuhnel | |
| 2004/0091111 A1 | 5/2004 | Levy et al. | |
| 2004/0099312 A1 | 5/2004 | Boyer et al. | |
| 2004/0103146 A1 | 5/2004 | Park | |
| 2004/0172178 A1 | 9/2004 | Takeda et al. | |
| 2004/0208687 A1 | 10/2004 | Sicz et al. | |
| 2004/0220708 A1 | 11/2004 | Owen et al. | |
| 2004/0220712 A1 | 11/2004 | Takeda et al. | |
| 2004/0222056 A1 | 11/2004 | Fox | |
| 2004/0256778 A1 | 12/2004 | Verriet | |
| 2005/0055156 A1 | 3/2005 | Maltagliati et al. | |
| 2005/0056507 A1 | 3/2005 | De Molina et al. | |
| 2005/0077131 A1 | 4/2005 | Russell | |
| 2005/0098401 A1 | 5/2005 | Hamilton et al. | |
| 2005/0104320 A1 | 5/2005 | Wesling et al. | |
| 2005/0107216 A1 | 5/2005 | Lee et al. | |
| 2005/0110229 A1 | 5/2005 | Kimura et al. | |
| 2005/0121269 A1 | 6/2005 | Namuduri | |
| 2005/0173849 A1 | 8/2005 | Vandewal | |
| 2005/0195094 A1 | 9/2005 | White | |
| 2005/0199455 A1 | 9/2005 | Browne et al. | |
| 2005/0216186 A1 | 9/2005 | Dorfman et al. | |
| 2005/0227798 A1 | 10/2005 | Ichida et al. | |
| 2005/0239601 A1 | 10/2005 | Thomas | |
| 2005/0288154 A1 | 12/2005 | Lee et al. | |
| 2006/0040793 A1 | 2/2006 | Martens et al. | |
| 2006/0064223 A1 | 3/2006 | Voss | |
| 2006/0065496 A1 | 3/2006 | Fox | |
| 2006/0066074 A1 | 3/2006 | Turner et al. | |
| 2006/0076757 A1 | 4/2006 | Bromley | |
| 2006/0081431 A1 | 4/2006 | Breese et al. | |
| 2006/0096817 A1 | 5/2006 | Norgaard et al. | |
| 2006/0113834 A1 | 6/2006 | Hanawa | |
| 2006/0120080 A1 | 6/2006 | Sipinski et al. | |
| 2006/0124414 A1 | 6/2006 | Hanawa | |
| 2006/0136173 A1 | 6/2006 | Case et al. | |
| 2006/0137934 A1 | 6/2006 | Kurth | |
| 2006/0144311 A1 | 7/2006 | Heyring et al. | |
| 2006/0163551 A1 | 7/2006 | Coenen et al. | |
| 2006/0163787 A1 | 7/2006 | Munster et al. | |
| 2006/0175792 A1 | 8/2006 | Sicz et al. | |
| 2006/0176216 A1 | 8/2006 | Hipskind | |
| 2006/0181034 A1 | 8/2006 | Wilde et al. | |
| 2006/0185951 A1 | 8/2006 | Tanaka | |
| 2006/0213082 A1 | 9/2006 | Meschan | |
| 2006/0219503 A1 | 10/2006 | Kim | |
| 2006/0225976 A1 | 10/2006 | Nakadate | |
| 2006/0225979 A1 | 10/2006 | Quinn et al. | |
| 2006/0231359 A1 | 10/2006 | Matsunaga et al. | |
| 2006/0237272 A1 | 10/2006 | Huang | |
| 2006/0253210 A1 | 11/2006 | Rosenberg | |
| 2006/0254365 A1 | 11/2006 | Hamel | |
| 2006/0265144 A1 | 11/2006 | Frolik | |
| 2006/0289258 A1 | 12/2006 | Fox | |
| 2007/0006489 A1 | 1/2007 | Case et al. | |
| 2007/0007743 A1 | 1/2007 | Becker et al. | |
| 2007/0008096 A1 | 1/2007 | Tracy | |

(56) References Cited

U.S. PATENT DOCUMENTS

| | | |
|---|---|---|
| 2007/0021885 A1 | 1/2007 | Soehren |
| 2007/0032981 A1 | 2/2007 | Merkel et al. |
| 2007/0034464 A1 | 2/2007 | Barefoot |
| 2007/0039790 A1 | 2/2007 | Timoney et al. |
| 2007/0051573 A1 | 3/2007 | Norgaard et al. |
| 2007/0070069 A1 | 3/2007 | Samarasekera et al. |
| 2007/0080515 A1 | 4/2007 | McAndrews et al. |
| 2007/0088475 A1 | 4/2007 | Nordgren et al. |
| 2007/0090518 A1 | 4/2007 | Sauciuc et al. |
| 2007/0119669 A1 | 5/2007 | Anderfaas et al. |
| 2007/0170688 A1 | 7/2007 | Watson |
| 2007/0199401 A1 | 8/2007 | Kawakami et al. |
| 2007/0213126 A1 | 9/2007 | Deutsch et al. |
| 2007/0213150 A1 | 9/2007 | Chattin et al. |
| 2007/0221054 A1 | 9/2007 | Webster et al. |
| 2007/0239479 A1 | 10/2007 | Arrasvuori et al. |
| 2007/0260372 A1 | 11/2007 | Langer |
| 2007/0272458 A1 | 11/2007 | Taniguchi et al. |
| 2008/0006494 A1 | 1/2008 | Vandewal |
| 2008/0009992 A1 | 1/2008 | Izawa et al. |
| 2008/0015089 A1 | 1/2008 | Hurwitz et al. |
| 2008/0018065 A1 | 1/2008 | Hirao et al. |
| 2008/0029730 A1 | 2/2008 | Kamo et al. |
| 2008/0041677 A1 | 2/2008 | Namuduri |
| 2008/0059025 A1 | 3/2008 | Furuichi et al. |
| 2008/0067019 A1* | 3/2008 | Jensen .................... F16F 9/535 188/267.2 |
| 2008/0093820 A1 | 4/2008 | McAndrews |
| 2008/0096726 A1 | 4/2008 | Riley et al. |
| 2008/0099968 A1 | 5/2008 | Schroeder |
| 2008/0108465 A1 | 5/2008 | Ichida |
| 2008/0109158 A1 | 5/2008 | Huhtala et al. |
| 2008/0116622 A1 | 5/2008 | Fox |
| 2008/0119330 A1 | 5/2008 | Chiang et al. |
| 2008/0162009 A1 | 7/2008 | Miki et al. |
| 2008/0163718 A1 | 7/2008 | Chiang |
| 2008/0185244 A1 | 8/2008 | Maeda et al. |
| 2008/0200310 A1 | 8/2008 | Tagliabue |
| 2008/0250844 A1 | 10/2008 | Gartner |
| 2008/0254944 A1 | 10/2008 | Muri et al. |
| 2008/0303320 A1 | 12/2008 | Schranz et al. |
| 2008/0312799 A1 | 12/2008 | Miglioranza |
| 2008/0314706 A1 | 12/2008 | Lun et al. |
| 2009/0000885 A1 | 1/2009 | McAndrews |
| 2009/0001684 A1 | 1/2009 | McAndrews et al. |
| 2009/0020382 A1 | 1/2009 | Van Weelden et al. |
| 2009/0038897 A1 | 2/2009 | Murakami |
| 2009/0048070 A1 | 2/2009 | Vincent et al. |
| 2009/0069972 A1 | 3/2009 | Templeton et al. |
| 2009/0070037 A1 | 3/2009 | Templeton et al. |
| 2009/0071772 A1 | 3/2009 | Cho et al. |
| 2009/0071773 A1 | 3/2009 | Lun |
| 2009/0098981 A1 | 4/2009 | Del et al. |
| 2009/0102628 A1 | 4/2009 | Takebayashi |
| 2009/0118100 A1 | 5/2009 | Oliver et al. |
| 2009/0121398 A1 | 5/2009 | Inoue |
| 2009/0131224 A1 | 5/2009 | Yuen |
| 2009/0138157 A1 | 5/2009 | Hagglund et al. |
| 2009/0140501 A1 | 6/2009 | Taylor et al. |
| 2009/0171532 A1 | 7/2009 | Ryan et al. |
| 2009/0192673 A1 | 7/2009 | Song et al. |
| 2009/0200126 A1 | 8/2009 | Kondo et al. |
| 2009/0200127 A1 | 8/2009 | Janes |
| 2009/0236807 A1 | 9/2009 | Wootten et al. |
| 2009/0258710 A1 | 10/2009 | Quatrochi et al. |
| 2009/0261542 A1 | 10/2009 | McIntyre |
| 2009/0277736 A1 | 11/2009 | McAndrews et al. |
| 2009/0288924 A1 | 11/2009 | Murray et al. |
| 2009/0294231 A1 | 12/2009 | Carlson et al. |
| 2009/0302558 A1 | 12/2009 | Shirai |
| 2009/0314592 A1 | 12/2009 | Nygren |
| 2009/0324327 A1 | 12/2009 | McAndrews et al. |
| 2010/0004097 A1 | 1/2010 | D'Eredita |
| 2010/0010709 A1 | 1/2010 | Song |
| 2010/0025946 A1 | 2/2010 | Inoue et al. |
| 2010/0032254 A1 | 2/2010 | Anderfaas et al. |
| 2010/0044975 A1 | 2/2010 | Yablon et al. |
| 2010/0059964 A1 | 3/2010 | Morris |
| 2010/0066051 A1 | 3/2010 | Haugen |
| 2010/0109277 A1 | 5/2010 | Furrer |
| 2010/0133764 A1 | 6/2010 | Greaves |
| 2010/0139442 A1 | 6/2010 | Tsumiyama |
| 2010/0147640 A1 | 6/2010 | Jones et al. |
| 2010/0160014 A1 | 6/2010 | Galasso et al. |
| 2010/0170760 A1 | 7/2010 | Marking |
| 2010/0186836 A1 | 7/2010 | Yoshihiro et al. |
| 2010/0198453 A1 | 8/2010 | Dorogusker et al. |
| 2010/0207351 A1 | 8/2010 | Klieber et al. |
| 2010/0224454 A1 | 9/2010 | Chen et al. |
| 2010/0244340 A1 | 9/2010 | Wootten et al. |
| 2010/0252972 A1 | 10/2010 | Cox et al. |
| 2010/0271191 A1 | 10/2010 | De Graff et al. |
| 2010/0276238 A1 | 11/2010 | Crasset |
| 2010/0276906 A1 | 11/2010 | Galasso et al. |
| 2010/0308516 A1 | 12/2010 | Galasso et al. |
| 2010/0308628 A1 | 12/2010 | Hsu et al. |
| 2010/0314917 A1 | 12/2010 | Hsieh et al. |
| 2010/0324781 A1 | 12/2010 | Gagliano |
| 2010/0326780 A1 | 12/2010 | Murakami |
| 2010/0327542 A1 | 12/2010 | Hara et al. |
| 2011/0022266 A1 | 1/2011 | Ippolito et al. |
| 2011/0067965 A1 | 3/2011 | McAndrews |
| 2011/0086686 A1 | 4/2011 | Avent et al. |
| 2011/0095507 A1 | 4/2011 | Plantet et al. |
| 2011/0097139 A1 | 4/2011 | Hsu et al. |
| 2011/0109060 A1 | 5/2011 | Earle et al. |
| 2011/0127706 A1 | 6/2011 | Sims et al. |
| 2011/0174582 A1 | 7/2011 | Wootten et al. |
| 2011/0202236 A1 | 8/2011 | Galasso et al. |
| 2011/0204201 A1 | 8/2011 | Kodama et al. |
| 2011/0214956 A1 | 9/2011 | Marking |
| 2011/0224901 A1 | 9/2011 | Aben et al. |
| 2011/0232147 A1 | 9/2011 | Zoellner et al. |
| 2011/0257848 A1 | 10/2011 | Shirai |
| 2011/0284333 A1 | 11/2011 | Krog et al. |
| 2011/0315494 A1 | 12/2011 | Marking |
| 2012/0006949 A1 | 1/2012 | Laird et al. |
| 2012/0007327 A1 | 1/2012 | Talavasek |
| 2012/0018263 A1 | 1/2012 | Marking |
| 2012/0018264 A1 | 1/2012 | King |
| 2012/0048665 A1 | 3/2012 | Marking |
| 2012/0074660 A1 | 3/2012 | Thomas |
| 2012/0080279 A1 | 4/2012 | Galasso et al. |
| 2012/0136537 A1 | 5/2012 | Galasso et al. |
| 2012/0181126 A1 | 7/2012 | De Kock |
| 2012/0221228 A1 | 8/2012 | Noumura et al. |
| 2012/0222927 A1 | 9/2012 | Marking |
| 2012/0228906 A1 | 9/2012 | McAndrews et al. |
| 2012/0253599 A1 | 10/2012 | Shirai |
| 2012/0253600 A1 | 10/2012 | Ichida et al. |
| 2012/0265414 A1 | 10/2012 | Cheng |
| 2012/0274043 A1 | 11/2012 | Lee et al. |
| 2012/0305350 A1 | 12/2012 | Ericksen et al. |
| 2012/0312648 A1 | 12/2012 | Yu et al. |
| 2013/0001030 A1 | 1/2013 | Goldasz et al. |
| 2013/0020748 A1 | 1/2013 | Kohlhauser et al. |
| 2013/0037361 A1 | 2/2013 | Park et al. |
| 2013/0081273 A1 | 4/2013 | McAndrews et al. |
| 2013/0090195 A1 | 4/2013 | Yamaguchi et al. |
| 2013/0119634 A1 | 5/2013 | Camp et al. |
| 2013/0144489 A1 | 6/2013 | Galasso et al. |
| 2013/0168195 A1 | 7/2013 | Park et al. |
| 2013/0220110 A1 | 8/2013 | Zhan et al. |
| 2013/0221713 A1 | 8/2013 | Pelot et al. |
| 2013/0228404 A1 | 9/2013 | Marking |
| 2013/0292218 A1 | 11/2013 | Ericksen et al. |
| 2013/0333993 A1 | 12/2013 | Yu |
| 2014/0008160 A1 | 1/2014 | Marking et al. |
| 2014/0027219 A1 | 1/2014 | Marking et al. |
| 2014/0048365 A1 | 2/2014 | Kim |
| 2014/0061419 A1 | 3/2014 | Wehage et al. |
| 2015/0073656 A1 | 3/2015 | Takamoto et al. |
| 2015/0081171 A1 | 3/2015 | Ericksen et al. |
| 2015/0090547 A1 | 4/2015 | Haugen |

(56) References Cited

U.S. PATENT DOCUMENTS

| | | |
|---|---|---|
| 2015/0141056 A1 | 5/2015 | Fefilatyev et al. |
| 2015/0175236 A1 | 6/2015 | Walthert et al. |
| 2015/0179062 A1 | 6/2015 | Ralston et al. |
| 2015/0191069 A1 | 7/2015 | Zuleger et al. |
| 2015/0197308 A1 | 7/2015 | Butora et al. |
| 2015/0233442 A1 | 8/2015 | Noguchi |
| 2015/0276000 A1 | 10/2015 | Kimura et al. |
| 2015/0291248 A1 | 10/2015 | Fukao et al. |
| 2016/0003320 A1 | 1/2016 | Kamakura et al. |
| 2016/0025178 A1 | 1/2016 | Kamakura et al. |
| 2016/0031506 A1 | 2/2016 | Lloyd et al. |
| 2016/0076617 A1 | 3/2016 | Marking |
| 2016/0153515 A1 | 6/2016 | Ebersbach et al. |
| 2016/0153516 A1 | 6/2016 | Marking |
| 2016/0185178 A1 | 6/2016 | Galasso et al. |
| 2016/0200163 A1 | 7/2016 | Tsukahara |
| 2016/0200164 A1 | 7/2016 | Tabata et al. |
| 2016/0265615 A1 | 9/2016 | Marking |
| 2016/0290431 A1 | 10/2016 | Marking |
| 2016/0319899 A1 | 11/2016 | Franklin et al. |
| 2016/0355226 A1 | 12/2016 | Pelot et al. |
| 2016/0364989 A1 | 12/2016 | Speasl et al. |
| 2017/0008363 A1 | 1/2017 | Ericksen et al. |
| 2017/0136843 A1 | 5/2017 | Marking |
| 2017/0184174 A1 | 6/2017 | Marking |
| 2017/0227083 A1 | 8/2017 | Janes |
| 2017/0247072 A1 | 8/2017 | Laird et al. |
| 2017/0259876 A1 | 9/2017 | Ericksen et al. |
| 2017/0268595 A1 | 9/2017 | Inagaki et al. |
| 2017/0282669 A1 | 10/2017 | Cox et al. |
| 2017/0291466 A1 | 10/2017 | Tong |
| 2018/0010666 A1 | 1/2018 | Marking |
| 2018/0031071 A1 | 2/2018 | Marking |
| 2018/0118302 A1 | 5/2018 | Fukao et al. |
| 2018/0150764 A1 | 5/2018 | Stenneth |
| 2018/0156300 A1 | 6/2018 | Sakai |
| 2018/0174446 A1 | 6/2018 | Wang |
| 2018/0208011 A1 | 7/2018 | Wigg et al. |
| 2018/0222541 A1 | 8/2018 | Madau et al. |
| 2018/0304149 A1 | 10/2018 | Galasso et al. |
| 2018/0326805 A1 | 11/2018 | Marking |
| 2018/0326808 A1 | 11/2018 | Ericksen et al. |
| 2018/0328442 A1 | 11/2018 | Galasso et al. |
| 2018/0328446 A1 | 11/2018 | Ericksen et al. |
| 2018/0334007 A1 | 11/2018 | Ericksen et al. |
| 2018/0334008 A1 | 11/2018 | Ericksen et al. |
| 2018/0335102 A1 | 11/2018 | Haugen |
| 2018/0339565 A1 | 11/2018 | Ericksen et al. |
| 2018/0339566 A1 | 11/2018 | Ericksen et al. |
| 2018/0339567 A1 | 11/2018 | Ericksen et al. |
| 2018/0355943 A1 | 12/2018 | Cox |
| 2018/0355946 A1 | 12/2018 | Ericksen et al. |
| 2019/0030975 A1 | 1/2019 | Galasso et al. |
| 2019/0031264 A1 | 1/2019 | Laird et al. |
| 2019/0032745 A1 | 1/2019 | Marking |
| 2019/0154100 A1 | 5/2019 | Coaplen et al. |
| 2019/0176557 A1 | 6/2019 | Marking et al. |
| 2019/0184782 A1 | 6/2019 | Shaw et al. |
| 2019/0203798 A1 | 7/2019 | Cox et al. |
| 2019/0247744 A1 | 8/2019 | Galasso et al. |
| 2019/0249769 A1 | 8/2019 | Hamed |
| 2019/0263474 A1 | 8/2019 | Hamed |
| 2019/0301598 A1 | 10/2019 | Sonenthal |
| 2020/0191227 A1 | 6/2020 | Laird |
| 2022/0252129 A1 | 8/2022 | Haugen |

FOREIGN PATENT DOCUMENTS

| | | |
|---|---|---|
| DE | 3241901 A1 | 5/1984 |
| DE | 3613386 A1 | 10/1986 |
| DE | 3532292 A1 | 3/1987 |
| DE | 3536655 A1 | 4/1987 |
| DE | 3709447 A1 | 10/1988 |
| DE | 3711442 A1 | 10/1988 |
| DE | 3738048 A1 | 5/1989 |
| DE | 3924166 C1 | 2/1991 |
| DE | 4022099 C1 | 12/1991 |
| DE | 4029090 A1 | 3/1992 |
| DE | 4406918 A1 | 9/1994 |
| DE | 19757276 A1 | 6/1999 |
| DE | 202004005229 U1 | 8/2004 |
| DE | 10326675 A1 | 12/2004 |
| DE | 102005025811 A1 | 12/2006 |
| DE | 102007063365 A1 | 7/2009 |
| DE | 202008015968 U1 | 4/2010 |
| DE | 202010012738 U1 | 12/2010 |
| EP | 207409 A2 | 1/1987 |
| EP | 304801 A2 | 3/1989 |
| EP | 0403803 A1 | 12/1990 |
| EP | 552568 A1 | 7/1993 |
| EP | 0735280 A2 | 10/1996 |
| EP | 1050696 A2 | 11/2000 |
| EP | 1138530 A2 | 10/2001 |
| EP | 1188661 A2 | 3/2002 |
| EP | 1241087 A1 | 9/2002 |
| EP | 1355209 A1 | 10/2003 |
| EP | 1394439 A1 | 3/2004 |
| EP | 1449688 A2 | 8/2004 |
| EP | 1623856 A2 | 2/2006 |
| EP | 1757473 A2 | 2/2007 |
| EP | 1825220 A2 | 8/2007 |
| EP | 2103512 A2 | 9/2009 |
| EP | 2116739 A2 | 11/2009 |
| EP | 2189191 A2 | 5/2010 |
| EP | 2248691 A1 | 11/2010 |
| EP | 2357098 A2 | 8/2011 |
| EP | 2410203 A2 | 1/2012 |
| EP | 2479095 A2 | 7/2012 |
| EP | 2495472 A2 | 9/2012 |
| EP | 2357098 B1 | 10/2014 |
| EP | 2848582 A1 | 3/2015 |
| EP | 3786049 A1 | 3/2021 |
| EP | 3786049 B1 | 5/2023 |
| FR | 1343760 A | 11/1963 |
| FR | 2432424 A1 | 2/1980 |
| FR | 2449236 A1 | 9/1980 |
| FR | 2529002 A2 | 12/1983 |
| FR | 2617928 A1 | 1/1989 |
| FR | 2952031 A1 | 5/2011 |
| GB | 806307 A | 12/1958 |
| GB | 1185074 A | 3/1970 |
| GB | 2104183 A | 3/1983 |
| GB | 2159234 A | 11/1985 |
| GB | 2159604 A | 12/1985 |
| GB | 2180320 A | 3/1987 |
| GB | 2190461 A | 11/1987 |
| GB | 2282864 A | 4/1995 |
| GB | 2289111 A | 11/1995 |
| GB | 2347479 A | 9/2000 |
| JP | 57173632 A | 10/1982 |
| JP | 57173632 U | 11/1982 |
| JP | 57182506 A | 11/1982 |
| JP | 01106721 A | 4/1989 |
| JP | H0193637 A | 4/1989 |
| JP | H02168038 A | 6/1990 |
| JP | H03113139 A | 5/1991 |
| JP | 04203540 A | 7/1992 |
| JP | 05149364 A | 6/1993 |
| JP | H05319054 A | 12/1993 |
| JP | 06101735 A | 4/1994 |
| JP | 06185562 A | 7/1994 |
| JP | H084818 A | 1/1996 |
| JP | 2005119548 A | 5/2005 |
| JP | 2005119549 A | 5/2005 |
| JP | 2007302211 A | 11/2007 |
| JP | 2008238921 A | 10/2008 |
| KR | 19980043226 U | 9/1998 |
| KR | 20070076226 A | 7/2007 |
| KR | 20100041679 A | 4/2010 |
| RU | 2469224 C1 | 12/2012 |
| WO | 9840231 A2 | 9/1998 |
| WO | 99/06231 | 2/1999 |
| WO | 0027658 A1 | 5/2000 |
| WO | 03070546 A1 | 8/2003 |

(56) References Cited

FOREIGN PATENT DOCUMENTS

| WO | 2007017739 A2 | 2/2007 |
|---|---|---|
| WO | 2007117884 A2 | 10/2007 |
| WO | 2008086605 A1 | 7/2008 |
| WO | 2008114445 A1 | 9/2008 |
| WO | 2013066159 A1 | 5/2013 |

OTHER PUBLICATIONS

European Search Report for European Application No. 19206334.5, 6 pages, dated May 12, 2020 (dated May 12, 2020).
European Search Report for European Application No. 19212356.0, 8 pages, dated May 7, 2020 (dated May 7, 2020).
European Search Report for European Application No. 20154392.3, 7 pages, dated Jul. 2, 2020 (dated Jul. 2, 2020).
European Search Report for European Application No. 20206708.8 , 11 pages, dated May 17, 2021.
Haller, E, EPO machine translation of CN 101468587 (A) Device with a suspension system and method for setting a suspension system, published on Jul. 1, 2009.
Machine translation DE3613386; Oct. 1986.
Machine translation EP 0403803; Dec. 1990.
Machine translation KR20100041679; Apr. 2010.
European Search Report for European Application No. 21170685.8, dated Nov. 10, 2021, 8 Pages.
EP Search Report for European Application No. 21173940.4, dated Nov. 12, 2021, 9 Pages.
European Search Report for European Application No. 20187747, dated Nov. 18, 2020, 11 Pages.
"Notice of Intent to Grant EP Application 09159949.8 dated Nov. 14, 2019, pp. 48".
Kensuke, Suspension Control Device, machine translation of JPH05319054 (A), Dec. 3, 1993 (Year: 1993).
Thum, "Oppostion Letter Against EP2357098", Dec. 17, 2019, 25 Pages.
Electronic Translation of DE3709447A1.
English language abstract for EP 0207409 (no date).
European Search Report for European Application No. 19155995 , 11 pages, dated Aug. 28, 2019.
European Search Report for European Application No. 19157767, dated Oct. 16, 2019, 9 Pages.
Fachkunde Fahrradtechnik 4 Auflage, Gressmann_Inhaltv und S, 2011, 206-207.
Statement of Grounds of Appeal, EP App. No. 11153607.4, May 28, 2018, 88 Pages.
European Search Report, European Patent Application No. 14189773.6, dated May 4, 2015, 4 Pages.
Grounds of Appeal, EP App. No. 11153607.4, dated Jun. 1, 2018, 28 Pages.
EP Search Report for European Application No. 15163428.4, dated Jul. 3, 2017, 7 Pages.
"17 Years of Innovation and Still Evolving", https://www.powertap.com/post/blog-15-17-years-of-innovation-and-still-evolving, Nov. 28, 2018, 8 Pages.
"ANT Message Protocol and Usage", Dynastream Innovations, Inc., Jul. 2, 2007, 68 Pages.
"Basis For Claims Filed Jan. 23, 2015", European Patent Application No. 14189773.6, 2 Pages.
"Communication Re Oral Proceedings for European Application No. 10161906, dated Feb. 15, 2013 (Feb. 15, 2013)".
"European Patent Office Final Decision dated Mar. 21, 2013", European Patent Application No. 10161906.2.
"European Search Report for European Application No. 09159949 , 2 pages, dated Sep. 11, 2017 (dated Sep. 11, 2017)".
"European Search Report for European Application No. 09177128, 4 pages, dated Aug. 25, 2010 (dated Aug. 25, 2010)".
"European Search Report for European Application No. 10161906 , 3 pages, dated Sep. 15, 2010 (dated Sep. 15, 2010)".
"European Search Report for European Application No. 10187320, 12 pages, dated Sep. 25, 2017 (dated Sep. 25, 2017)".
"European Search Report for European Application No. 11153607, 3 pages,dated Aug. 10, 2012 (dated Aug. 10, 2012))".
"European Search Report for European Application No. 11172553, 2 pages, dated Sep. 25, 2017 (dated Sep. 25, 2017)".
"European Search Report for European Application No. 11172612 , 2 pages, dated Oct. 6, 2011 (dated Oct. 6, 2011))".
"European Search Report for European Application No. 11175126, 2 pages,dated Sep. 25, 2017 (dated Sep. 25, 2017)".
"European Search Report for European Application No. 11275170 , 2 pages, dated Jan. 10, 2018 (dated Jan. 10, 2018)".
"European Search Report for European Application No. 12170370 , 2 pages, dated Nov. 15, 2017 (dated Nov. 15, 2017)".
"European Search Report for European Application 12184150, 10 pages, dated Dec. 12, 2017 (dated Dec. 12, 2017)".
"European Search Report for European Application No. 13158034 , 4 pages, dated Jun. 28, 2013 (dated Jun. 13, 2013))".
"European Search Report for European Application No. 13174817.0, 13 pages, dated Jan. 8, 2018 (dated Jan. 8, 2018))".
"European Search Report for European Application No. 13189574, 2 pages, dated Feb. 19, 2014 (dated Feb. 19, 2014)".
"European Search Report for European Application No. 15167426 , 4 pages, dated Sep. 18, 2015 (dated Sep. 18, 2015))".
"European Search Report for European Application No. 16167306 , 2 pages, dated Mar. 23, 2017 (dated Mar. 23, 2017)".
"European Search Report for European Application No. 17154191, 2 pages, dated Jun. 28, 2017 (dated Jun. 28, 2017)".
"European Search Report for European Application No. 17188022 , 9 pages, dated Feb. 1, 2018 (dated Feb. 1, 2018))".
"European Search Report and Written Opinion, European Patent Application No. 13165362.8", dated Sep. 24, 2014, 6 Pages.
"European Search Report for EP Application No. 18154672, 3 pages, dated Aug. 28, 2018 (dated Aug. 8, 2018))".
"Office Action for European Application No. 13158034.2, 5 pages, dated May 22, 2014".
"The Lee Company Technical Hydraulic Handbook", 1996, 1-696.
Healey, "The Tyre as Part of the Suspension System", The Institution of Automobile Engineers, Nov. 1924, 26-128.
Kasprzak, "Understanding Your Dampers: A guide from Jim Kasprzak", http://www.kaztechnologies.com/downloads/kaz-tech-tips/ Accessed: Oct. 24, 2018, 25 pages.
Litchfield, "Pneumatic Tires", Transactions (Society of Automobile Engineers), vol. 8, Part II, 1913, 208-223.
Nilsson, "Opposition Letter Against EP-2357098", Oct. 13, 2017, 7.
Puhn, "How To Make Your Car Handle", HPBooks, 1981, 7 Pages.
Shiozaki, et al., "SP-861-Vehicle Dynamics and Electronic Controlled Suspensions SAE Technical Paper Series No. 910661", International Congress and Exposition, Detroit, Mich., Feb. 25-Mar. 1, 1991.
Smith, ""The Bump Stop" in Engineer to win—Chapter 13: Springs and Shock Absorbers", MBI Publishing Company and Motorbooks, USA XP055430818, ISBN: 978-0-87938-186-8, Dec. 31, 1984, 207.
Thum, Notice of Opposition to a European Patent, EP App. No. 14189773.6, Dec. 13, 2018, 49 Pages.
Thum, "Oppostion Letter Against EP2357098", Oct. 16, 2018, 39.
Waechter, et al., "A Multibody Model for the Simulation of Bicycle Suspension Systems", Vehicle System Dynamics, vol. 37, No. 1, 2002, 3-28.

\* cited by examiner

METHODS AND APPARATUS FOR CONTROLLING A FLUID DAMPER

CROSS-REFERENCE TO RELATED APPLICATIONS

This application claims priority to and benefit of co-pending U.S. patent application Ser. No. 16/565,106, filed on Sep. 9, 2019, entitled "METHODS AND APPARATUS FOR CONTROLLING A FLUID DAMPER" by John Marking, which is herein incorporated by reference, and assigned to the assignee of the present application.

The application Ser. No. 16/565,106 claims priority to and benefit of U.S. patent application Ser. No. 15/394,622, now U.S. Pat. No. 10,406,883, filed on Dec. 29, 2016, entitled "METHODS AND APPARATUS FOR CONTROLLING A FLUID DAMPER" by John Marking, which is herein incorporated by reference, and assigned to the assignee of the present application.

The application Ser. No. 15/394,622 claims priority to and benefit of U.S. patent application Ser. No. 14/590,836, now U.S. Pat. No. 9,550,405, filed on Jan. 6, 2015, entitled "METHODS AND APPARATUS FOR CONTROLLING A FLUID DAMPER" by John Marking, which is herein incorporated by reference, and assigned to the assignee of the present application.

The application Ser. No. 14/590,836 claims priority to and benefit of U.S. patent application Ser. No. 12/902,239, now U.S. Pat. No. 8,955,653, filed on Oct. 12, 2010, entitled "METHODS AND APPARATUS FOR CONTROLLING A FLUID DAMPER" by John Marking, which is herein incorporated by reference, and assigned to the assignee of the present application.

The U.S. patent application Ser. No. 12/902,239 claims priority to and benefit of U.S. provisional patent application Ser. No. 61/250,927, filed Oct. 13, 2009, entitled "SYSTEM FOR MAGNETIC-RHEOLOGICAL (MR) FLUID", by John Marking, which is herein incorporated by reference, and assigned to the assignee of the present application.

BACKGROUND OF THE INVENTION

Field of the Invention

The present invention relates to shock absorbers for vehicles. More particularly, the disclosure relates to fluid dampers. More particularly still, the disclosure relates to methods and apparatus for controlling and managing dampening through the selective use of dampening fluid having variable flow characteristics.

Description of Related Art

Magneto rheological fluid (MR fluid) is a variable character fluid comprising a (e.g. colloid like) suspension of micrometer-sized particles in a carrier fluid, often a type of oil. When subjected to a magnetic field, the fluid greatly increases its apparent viscosity and/or shear strength. The particles, which are typically micrometer or nanometer scale spheres or ellipsoids, are active when subjected to a magnetic field (e.g. such as iron particles) and are distributed randomly and in suspension within the carrier liquid under normal circumstances. When a magnetic field is applied to the liquid suspension, however, the particles (usually in the 0.1-10 μm range) align themselves along lines of magnetic flux. When the fluid is contained between two poles (typically of separation 0.5-2 mm), the resulting chains of particles restrict the movement of the fluid, perpendicular to the direction of flux, effectively increasing its viscosity and/or shear strength. The yield stress of the fluid when it is "activated" or in an "on" magnetized state can be controlled very accurately and quickly (typically a few milliseconds) by varying the magnetic field intensity.

There are problems arising from the use of variable viscosity fluids, like MR fluid in mechanical applications. For example, even in the absence of electromagnetic energy, MR fluid is very dense, resulting in much greater viscosity and strength (up to four times) compared to "normal" fluids. Mechanical systems using such fluids may not be capable of handling corresponding dynamic loads.

Another problem with the MR fluid is its abrasiveness. This abrasiveness is caused by the ferrous particles suspended in the oil as they can have a sandpaper effect on all of the moving parts. Mechanical systems employing such fluids may be rapidly worn out.

What is needed is a damper for a suspension system that utilizes variable rheology fluid in a manner that avoids problems associated with use of such fluid.

SUMMARY OF THE INVENTION

The present invention generally includes a fluid damper comprising a first fluid-filled chamber, a second chamber filled with a fluid having variable flow characteristics and at least partially displaceable by the first fluid, and a gas chamber, the gas chamber compressible due to the displacement of the second chamber. In one embodiment, the fluid in the second chamber is a variable rheology fluid.

BRIEF DESCRIPTION OF THE DRAWINGS

So that the manner in which the above recited features can be understood in detail, a more particular description, briefly summarized above, may be had by reference to embodiments, some of which are illustrated in the appended drawings. It is to be noted, however, that the appended drawings illustrate only typical embodiments of the invention and are therefore not to be considered limiting of its scope, for the invention may admit to other equally effective embodiments.

DETAILED DESCRIPTION

Figure 1:
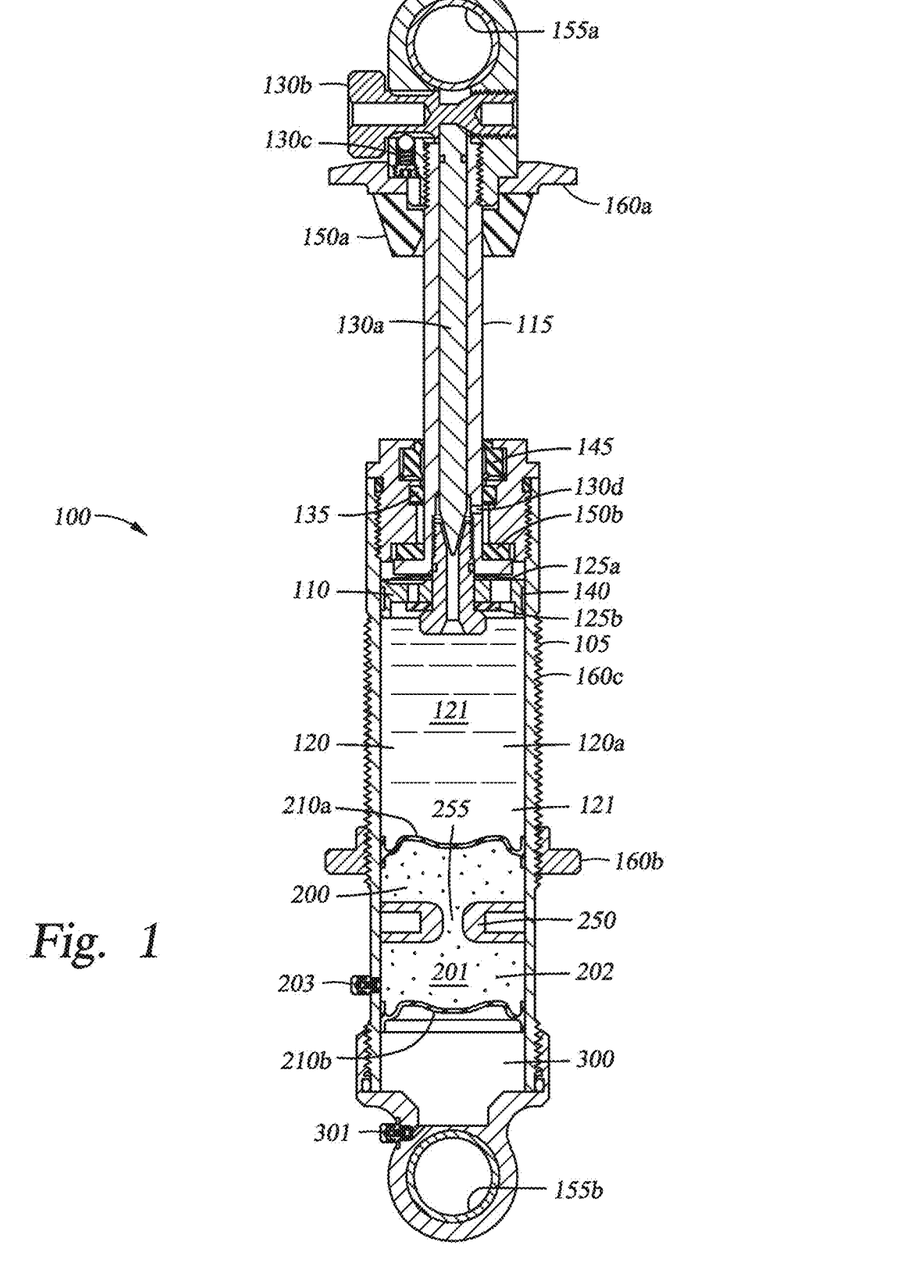
FIG. 1 is a section view of a damper according to one embodiment.
Figure 2:
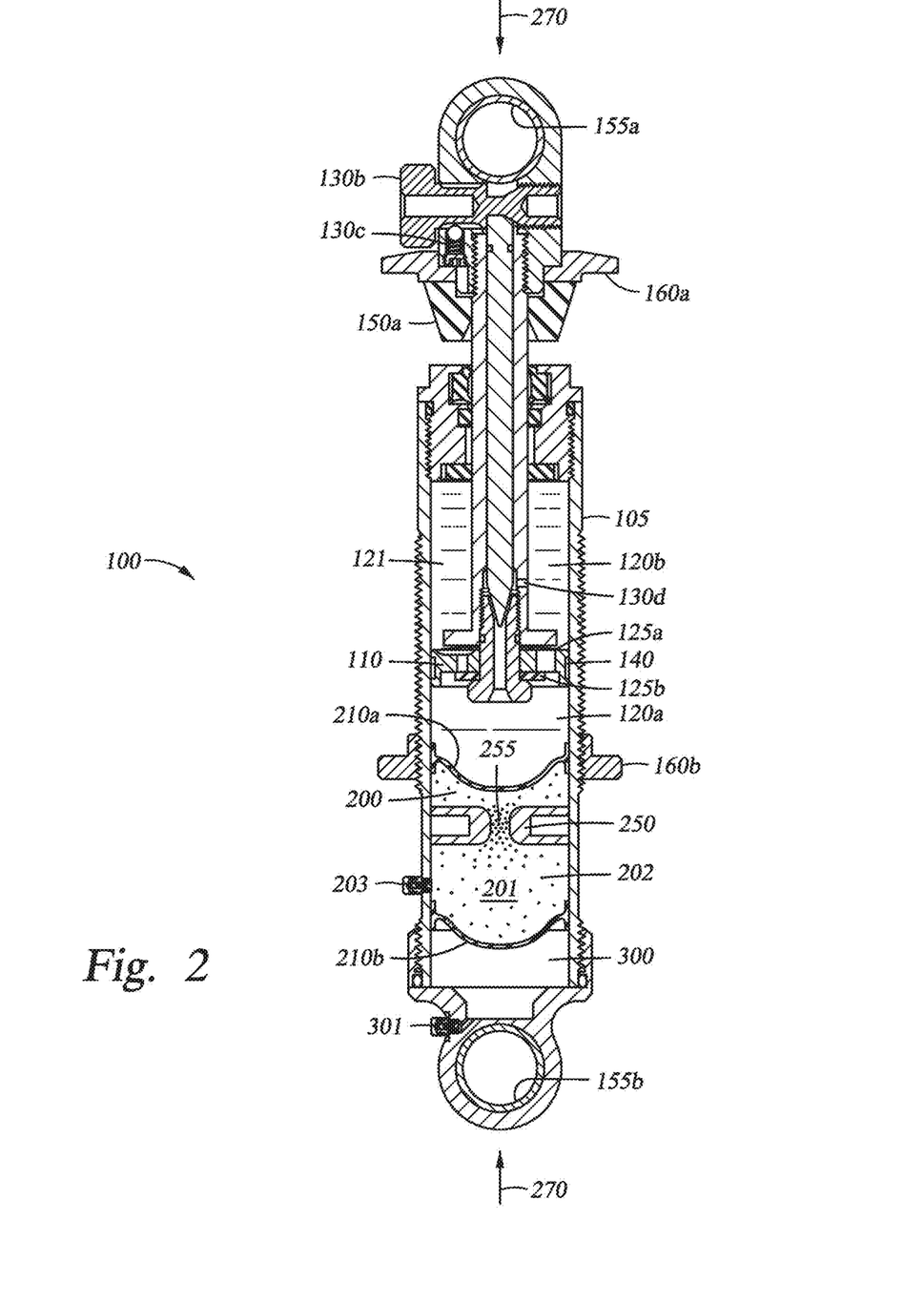
FIG. 2 is a section view of the damper of FIG. 1 with the damper in a compression stroke.

FIG. 1 is a section view of a damper 100. The damper includes a housing 105 as well as a piston 110 and rod 115 for reciprocating within the housing in compression and retraction or "rebound" strokes. The housing includes a first chamber 120 filled with a first fluid 121, and the chamber is dividable into a compression side 120a (shown in FIG. 1) and a rebound side 120b (FIG. 2). The piston 110 is often provided with fluid pathways therethrough including shims 125 a, b which permit fluid to pass between sides 120a, 120b of the first chamber 120 while providing predetermined damping flow resistance. For example, during a compression stroke shims 125a are displaceable to permit fluid to move through the piston in an upwards direction. Similarly, during a rebound stroke, shims 125b permit fluid to flow back into the compression side 120a of the first chamber 120. In addition to shims 125a, fluid metering in a compression stroke is controlled by a valve assembly consisting of an axially adjustable member 130a which permits and restricts fluid flow. Member 130a is adjustable by a user through the manipulation of a knob 130b having a detent mechanism 130c to indicate the axial position of member 130a. The valve assembly is adjustable to permit fluid from the compression side 120a of the chamber to flow to the rebound side 120b through a fluid path 130d. Rebound flow may also flow, in an opposing direction during rebound, through that path.

An outer surface of the rod 115 is sealed and centered relative to an inner surface of the housing 105 with a seal and rod bushing 135, and an outer surface of the piston is sealed with an inner surface of the housing by another seal 140. A wiper seal 145 prevents contamination from entering the housing 105 and bumpers 150a, 150b prevent the piston 110 from bottoming or topping out as it reciprocates in the housing 105. At an upper end of the rod 115, a mounting eye 155a permits the rod to be mounted to another part of the vehicle suspension system (not shown), and another mounting eye 155b at a lower end of the housing permits the housing portion of the damper 100 to be mounted to a vehicle frame.

In operation, the damper 100 of FIG. 1 works in conjunction with a spring member (not shown). In one embodiment comprising a mechanical spring (not shown) the damper includes a first spring flange 160a mounted on the rod and a second spring flange 160b mounted on the housing where a spring would be situated axially between the two spring flanges. In one embodiment a coil spring (not shown) extends between the first and second spring flange to provide resistance to compressive forces during operation of the damper 100. Threads 160c formed on an outer surface of the housing 105 permit adjustment of spring flange 160b in order to adjust the preload of a coil spring. In one embodiment a damper hereof is used in conjunction with an air spring. Some exemplary air spring configurations are shown in U.S. Pat. No. 6,135,434 ("'434 Patent) which patent is entirely incorporated herein by reference. Referring to FIGS. 3, 4, 5 of the '434 Patent, the chamber 200, fluid 201 barriers 210 and magnet 250 would be situated within damping chamber 21A in a fashion generally as described herein.

Also included within the damper housing 105 is a second chamber 200 formed adjacent the compression side 120a of the first chamber 120 and fluidically isolated from the first chamber. The second chamber includes a fluid having variable flow characteristics like a variable rheology (e.g. viscosity, shear strength) fluid 201 which, in a present embodiment is an MR fluid. A fill valve 203 permits the fluid 201 to be inserted into the chamber 200. In one embodiment, the fluid 201 comprises particles 202 having magnetic properties as illustrated in the chamber. The chamber 200 is housed between two flexible end walls 210 a, b at a first and second end of the chamber. In one example, the end walls are made of an elastomer-type material which is affixed at an outer perimeter to the inside of the housing wall. In one embodiment each end wall is pre-fabricated with (e.g. bonded to) its own perimeter ring. The rings (having seals about an outer diameter thereof for sealing engagement with an inner diameter of the housing 105) are then installed in an interior of the damper housing and retained in that position by a shoulder member, or snap ring, or suitable axial retainer or combination thereof (not shown). The end walls 210a, b are constructed and arranged to be flexible (and optionally highly elastic) so that portions of the walls are displaceable longitudinally within the housing 105 and each can be displaced to accommodate axial movement of the volume of fluid 201. In this manner, the fluid 201 in the second chamber 200 is displaceable longitudinally within the damper housing 105 depending upon pressures and forces acting within the damper as will be further explained in relation to FIG. 2.

In addition to end walls 210 made of an elastomer material, there are a number of other constructions that could serve a similar purpose. In one example, the end walls are made of a metallic or non-metallic material that in a normal state, includes corrugations or folds (e.g. bellows). When acted upon by pressurized fluid or gas however, the corrugations at least partially straighten out, permitting the walls some flexibility to move the fluid in relation to pressures within the housing 105. Thereafter, the walls return to a somewhat folded shape. In another instance, the second chamber is simply formed between a pair of floating pistons spaced far enough apart to house the fluid volume.

Also disposed within the second chamber 200 is a magnet 250. In one embodiment the magnet 250 is a permanent magnet of a pre-selected strength for providing a desired effect on the fluid 201. In one embodiment the magnet 250 is a "doughnut" shaped magnet. In one embodiment, providing for variable magnetic field (and flux), the magnet 250 comprises an electromagnet. As described herein, electromagnets use electric current to generate a magnetic field which can be turned "on" or "off" or may be modulated to higher or lower flux states as desired. When connected to a DC voltage or current source, the electromagnet becomes energized and creates a magnetic field like a permanent magnet. Electromagnets are often made from relatively soft yet conductive metal winding which quickly dissipates the induced magnetism after the current is switched off. In one embodiment, the electromagnet 250 is doughnut-shaped and forms an orifice 255 at its center which is constructed and arranged to meter the fluid in the second chamber 200 as the fluid is forced from one side of the magnet to the other during compression and rebound strokes respectively. When electric current is supplied to the electromagnet, magnetic flux lines are imposed within the fluid 201 and magnetic particles 202 in the fluid 200 align with such flux lines and become relatively stationary with respect to the magnet. This effect increases the resistance to movement of the fluid in the area of the orifice 255. The magnetic flux density is proportional to the magnitude of the current flowing in the wire of the electromagnet. As such the higher the current that is supplied to the magnet the more resistant to flow will be the fluid 201 because more fluid, further into the center of the orifice will be subjected to the magnetic field thereby "freezing" a greater thickness of particles proximate the orifice.

In order to lessen the abrasive effects of the MR fluid, the magnetic orifice 255 may be coated with an abrasion resistant substance. In one instance, the magnet can be coated with a super hard yet tough material such as for example tungsten carbide with relatively medium to high nickel and/or cobalt content. In another embodiment, the magnet can be coated with medium hard rubber such as Nitrile shore A 70 or 80 (or other elastomer). In one embodiment the magnet can be coated with ceramic or super hard material which in turn is coated with rubber. In one embodiment the orifice may be coated with any suitable combination of hard or compliant abrasion resistant materials. Further the magnet may be surrounded by a fluid retaining barrier to ensure that the magnet is isolated from the fluid and the retaining barrier may in turn be coated for abrasion resistance in any suitable manner. In each of these examples, the material of the magnet is protected from abrasion, fluid invasion and/or corrosion while the coating is chosen to minimize its effect on the magnetic properties of the component (e.g. the coatings and barriers are preferably materials lacking in magnetic properties such as, for example, 300 series stainless steels, noble metals and alloys or polymers or ceramics).

While the embodiment shown includes an electromagnet 250 in the interior of the damper housing 105, the magnet could be annularly arranged on an exterior of the housing and still effect the MR fluid in a way that increases its flow resistance. Electromagnet arrangements external to a damper are disclosed in U.S. Pat. No. 7,422,092 and that patent is incorporated by reference herein in its entirety. In one embodiment a magnet (functionally 250) may be circumferentially intermittent so that is within the housing or without the housing or a combination thereof. In one embodiment a series of magnet are placed axially adjacent the fluid 201 so that various magnets may be activated in series at various points in the stroke of the damper to result in a position dependent damping characteristic.

In one embodiment a gas chamber 300 which is filled with nitrogen to some predetermined pressure is in pressure communication with the second chamber 200. A fill valve 301 permits pressurization of the gas chamber. The purpose of the gas chamber 300 is to act as a compressible reservoir whereby fluid volume from the first 120 chamber can displace a portion of the gas chamber as the piston rod 115 (and its associated volume) moves into the damper housing 105. Additionally, the gas chamber provides a non-linear, spring-like resistance during a compression stroke of a damper due to its pressure acting on an end area of rod 115. In one embodiment the chamber 200 including fluid 201, barriers 210 and magnet 250 are placed between a compression chamber and a reservoir gas charge in place of, for example, intensifier assembly 780 of FIG. 32 of U.S. Pat. No. 7,374,028 ("028 Patent") which patent is entirely incorporated herein by reference. In one embodiment, the chamber 200 and fluid 201 with barriers 210 and magnet 250 are placed in parallel with an intensifier assembly like, for example, intensifier 780 of the '028 Patent. In one embodiment, the chamber 200 and fluid 201 with barriers 210 and magnet 250 are placed in series with an intensifier assembly like, for example, intensifier 780 of the '028 Patent. While the embodiment shown includes a gas chamber, the compressible portion of the damper could be a mechanical spring disposed, for example in an atmospheric chamber.

FIG. 2 is a section view of the damper 100 of FIG. 1 illustrating the damper during a compression stroke. As illustrated by the arrows 270, the piston and rod are moving into and towards a lower end of the first chamber 120 and the first fluid 121, which in the embodiment of the Figures is a relatively "Newtonian" fluid, is being metered through shims 125a in the piston from a compression 120a to a rebound 120b side of the first chamber 120. Also illustrated in FIG. 2, the second chamber 200 with its flexible end walls 210a, b is being displaced downwardly and in turn, is compressing the gas chamber in order to compensate for a reduction in volume in the housing 105 due to the volume of the piston rod 115 as it enters the housing 105.

In FIG. 2, the second chamber 200 and fluid 201 therein are also being displaced relative to the electromagnet 250 with at least part of the MR fluid in the second chamber 200 having been urged, during compression stroke, through the orifice 255 formed in the center of the electromagnet 250. In FIG. 2, the electromagnet 250 is illustrated in an "on" condition where electric current is being provided to the magnet. As illustrated, particles 202 in the MR fluid have gathered (and "bunched") in the orifice due to the magnetic field generated by the magnet. The effective result is an increased flow resistance of the MR fluid in the area of the orifice 255 and correspondingly increased dampening in the compression stroke of the damper since the orifice (through which the MR fluid must pass as the second chamber 200 is displaced) has effectively been made smaller by the clustered particles 202. It is noteworthy that the same mechanism can be selectively activated, or deactivated, during rebound to achieve a desire rebound damping resistance as the fluid 201 flows back "up" through the orifice. As mentioned herein, the magnetic flux density brought about is proportional to the magnitude of the current flowing in the wire of the electromagnet. In other words the electromagnet controlled orifice, in combination with a magnetically sensitive fluid, can operate as a valve with an infinite number of settings (including fully "open", fully "closed" and all points between) depending on the applied current.

While the gas chamber 300 is shown housed in the main damper housing 105, the gas chamber could be remotely located in a separate housing and the second chamber with the MR fluid could also be disposed in the separate housing with fluid communication between the main and remote housings (for example refer to the '028 Patent). In the example of a remote gas chamber, the communication path between the two housings would still permit the second chamber 200 to be displaced, thereby moving the variable viscosity MR fluid relative to the electromagnet 250. Remote gas chambers/reservoirs are shown and described in US patent application no. 2010/0170760 assigned to the owner of the present patent application and that co-pending application is incorporated herein by reference in its entirety.

The damper 100 disclosed herein is intended for use in vehicles, including bicycles and any other type suspended vehicle or motor vehicle. When used with bicycles for example, the electromagnet 250 can be battery powered using power from an existing battery (such as for a head light, for example) or used with its own on-board battery. In one embodiment the magnet could be a permanent magnet and could be mechanically moved closer or further from the fluid 201 and/or orifice to facilitate a greater or lesser magnetic effect. In one embodiment a magnetic field "insulator" (such as for example a shunted conductive sheath or merely a non-conductive spacer) could be selectively interposed between the magnet and the fluid 201/orifice for creating a stronger or lesser magnetic field within the fluid 201 (e.g. proximate the orifice). Permanent magnet embodiments may not require any external power source where manual manipulation may be used to perform the function of moving either the magnet or an insulator or any suitable combination thereof to alter the strength of the magnetic fields within the fluid 201.

An electromagnet's strength is determined by the material in the core; the amount of current in the wire; and the number of turns that the wire makes around the core. Therefore, depending upon the physical characteristics of the magnet, a single AA battery can power the electromagnet disclosed herein. When used with a motor vehicle, the magnet and any control components related to it can easily be powered by the vehicle's battery or alternator (i.e. onboard electrical generation).

While the electromagnet is shown in its "on" position in the compression stroke of FIG. 2, the magnet might be in an "off" position during a rebound stroke when the piston and rod are returning to an upper end of the housing. The magnet's ability to become quickly de-energized once electric current is removed permits its use during one stroke, or a part of one stroke and not the opposite stroke. Such attribute greatly enhances the selectivity which can be applied to the use of the magnetic flow control function. The "on" and "off" conditions are controlled by a switch or potentiometer which can be manually operated or can be automatically operated (e.g. with a microprocessor and solenoids if needed) based upon one or more sensed conditions within the shock absorber or operational conditions of the vehicle.

Figure 3:
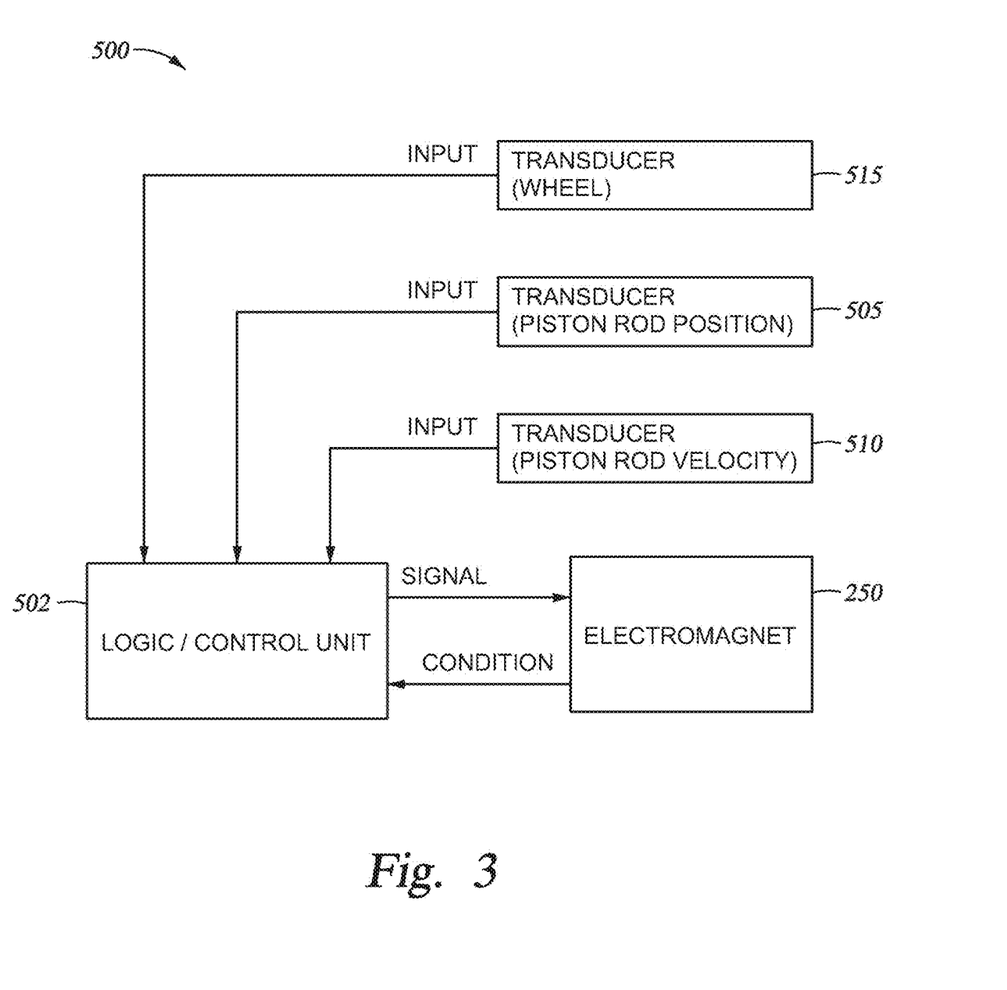
FIG. 3 is a schematic diagram showing one control arrangement for dampers.

When used with a motor vehicle, especially an automobile, each wheel of the vehicle can be equipped with a damper 100 having an MR fluid-filled chamber. In these instances, a control system can permit the dampers to work in unison or separately depending upon terrain conditions and how a logic/control unit is programmed. FIG. 3 shows a schematic diagram of a remote control system 500 based upon any or all of vehicle speed, damper rod speed, and damper rod position. In one embodiment, the system is designed to automatically increase dampening in a shock absorber in the event a damper rod reaches a certain velocity in its travel towards, for example, the bottom end of a damper at a predetermined speed of the vehicle. In one embodiment the system adds dampening (and control) in the event of rapid operation (e.g. high rod velocity) of the damper to avoid a bottoming out of the damper rod as well as a loss of control that can accompany rapid compression of a shock absorber with a relative long amount of travel. In one embodiment, the system adds dampening (e.g. orders the magnet to its "on" position) in the event that the rod velocity in compression is relatively low, but the rod progresses past a certain point in the travel. Such configuration aids in stabilizing the vehicle against excessive low rate suspension movement events such as cornering roll, braking and acceleration yaw and pitch and "g-out."

FIG. 3 illustrates, for example, a system including three variables: rod speed, rod position and vehicle speed. Any or all of the variables shown may be considered by logic control unit 502 in controlling the electromagnet 250. Any other suitable vehicle operation variable may be used in addition to or in lieu of the variables 515, 505, 510 such as for example piston rod compression strain, steering wheel position, brake pedal position, accelerator pedal position, eyelet strain, vehicle mounted accelerometer data or any other suitable vehicle or component performance data or combination thereof. In one embodiment, a suitable proximity sensor or linear coil transducer or other electromagnetic transducer is incorporated in the dampening cylinder to provide a sensor to monitor the position and/or speed of the piston (and suitable magnetic tag) with respect to the cylinder. In one embodiment, the magnetic transducer includes a waveguide and a magnet that is joined to the cylinder and oriented such that the magnetic field generated by the magnet passes through the piston rod and the waveguide. Electric pulses are applied to the waveguide from a pulse generator that provides a stream of electric pulses, each of which is also provided to a signal processing circuit for timing purposes. When the electric pulse is applied to the waveguide a magnetic field is formed surrounding the waveguide. Interaction of this field with the magnetic field from the magnet causes a torsional strain wave pulse to be launched in the waveguide in both directions away from the magnet. A coil assembly and sensing tape is joined to the waveguide. The strain wave causes a dynamic effect in the permeability of the sensing tape which is biased with a permanent magnetic field by the magnet. The dynamic effect in the magnetic field of the coil assembly due to the strain wave pulse, results in an output signal from the coil assembly that is provided to the signal processing circuit along signal lines.

By comparing the time of application of a particular electric pulse and a time of return of a sonic torsional strain wave pulse back along the waveguide, the signal processing circuit can calculate a distance of the magnet from the coil assembly or the relative velocity between the waveguide and the magnet. The signal processing circuit provides an output signal, digital or analog, proportional to the calculated distance and/or velocity. Such a transducer-operated arrangement for measuring rod speed and velocity is described in U.S. Pat. No. 5,952,823 and that patent is incorporated by reference herein in its entirety.

While a transducer assembly located at the damper measures rod speed and location, a separate wheel speed transducer for sensing the rotational speed of a wheel about an axle includes housing fixed to the axle and containing therein, for example, two permanent magnets. In one embodiment the magnets are arranged such that an elongated pole piece commonly abuts first surfaces of each of the magnets, such surfaces being of like polarity. Two inductive coils having flux-conductive cores axially passing therethrough abut each of the magnets on second surfaces thereof, the second surfaces of the magnets again being of like polarity with respect to each other and of opposite polarity with respect to the first surfaces. Wheel speed transducers are described in U.S. Pat. No. 3,986,118, which is incorporated herein by reference in its entirety.

In one embodiment, as illustrated in FIG. 3, a logic unit 502 with user-definable settings receives inputs from the rod speed 510 and location 505 transducers as well as the wheel speed transducer 515. The logic unit is user-programmable and depending on the needs of the operator, the unit records the variables and then if certain criteria are met, the logic circuit sends its own signal to the magnet to either turn "on" or "off". Thereafter, the condition of the electromagnet 250 is relayed back to the logic unit 502.

While the examples herein refer to the electromagnet 250 as being in an "on" or "off" position, it will be understood that the nature of the electromagnet permits it to be energized to an infinite number of positions between "off" and fully "on". For example, a logic control unit 502 can be programmed to energize the magnet 250 to some intermediate level based upon a corresponding level of input from a sensor. These incremental adjustments of energy (and the resulting incremental adjustments to dampening) are fully within the scope of the invention.

As the forgoing illustrates the invention addresses problems associated with using variable rheology fluids in mechanical systems. The second chamber serves to keep the MR fluid close to the electromagnet and reduces the amount of MR fluid necessary for use in the damper while isolating the fluid from the piston, seals and other parts of the damper that may be sensitive to wear and damage from the abrasive particles contained in the MR fluid.

While the foregoing is directed to embodiments of the present invention, other and further embodiments of the invention may be devised without departing from the basic scope thereof, and the scope thereof is determined by the claims that follow.

I claim:
1. A damper comprising:
a damper body having a longitudinal axis and at least partially defining a fluid chamber containing damping fluid;

a piston rod, movable along the longitudinal axis of, and within, said damper body, wherein during a compression stroke, a portion of said piston rod moves into said damper body at least partially within a first portion of said fluid chamber;

an enclosed fluid chamber disposed within said damper, said enclosed fluid chamber at least partially bounded by a first movable member separating said first portion of said fluid chamber from said enclosed fluid chamber;

a gas-filled chamber coupled with said fluid chamber;

said enclosed fluid chamber having a variable rheology fluid disposed therein, said enclosed fluid chamber at least partially displaceable by said damping fluid wherein movement of said enclosed fluid chamber causes a volume change in said gas-filled chamber; and a magnet disposed within said enclosed fluid chamber, said magnet configured to provide a magnetic field which affects said variable rheology fluid, wherein said magnet selectively produces said magnetic field within said enclosed fluid chamber to bring about a change in said rheology fluid, wherein a portion of said rheology fluid travels through an orifice in said magnet when said enclosed fluid chamber is displaced, and wherein said orifice of said magnet is coated with an abrasion resistant material.

2. The damper of claim 1 wherein said magnet is an electromagnet.

3. The damper of claim 2 wherein said electromagnet is remotely actuatable.

4. The damper of claim 3 further comprising:
a logic/control unit coupled with said electromagnet for controlling operation of said electromagnet.

5. The damper of claim 4 wherein said logic/control unit controls said electromagnet based upon an input provided from a vehicle to which said damper is coupled.

6. The damper of claim 5 wherein said input is selected from the group consisting of: wheel speed, damper piston velocity, and piston rod position.

7. The damper of claim 1, wherein said first movable member comprises a flexible end-wall permitting said enclosed fluid chamber to be displaced relative to said magnet.

8. The damper of claim 1, wherein said rod includes a valve assembly configured to control flow of said damping fluid.

9. The damper of claim 1, wherein said variable rheology fluid comprises a magneto-resistive (MR) fluid.

10. The damper of claim 1, wherein said gas-filled chamber is filled with a pressurized gas.

* * * * *